United States Patent
Pakrooh et al.

(10) Patent No.: US 12,519,678 B2
(45) Date of Patent: Jan. 6, 2026

(54) RADIO FREQUENCY SENSING CONTROL FOR AN ULTRA-WIDEBAND SYSTEM

(71) Applicant: QUALCOMM Incorporated, San Diego, CA (US)

(72) Inventors: Pooria Pakrooh, San Marcos, CA (US); Bin Tian, San Diego, CA (US); Stephen Jay Shellhammer, Ramona, CA (US); Le Nguyen Luong, San Diego, CA (US); Koorosh Akhavan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/499,972

(22) Filed: Nov. 1, 2023

(65) Prior Publication Data

US 2024/0380641 A1 Nov. 14, 2024

Related U.S. Application Data

(60) Provisional application No. 63/502,117, filed on May 14, 2023.

(51) Int. Cl.
*H04W 24/10* (2009.01)
*H04L 25/02* (2006.01)
*H04W 76/10* (2018.01)

(52) U.S. Cl.
CPC ......... *H04L 25/0212* (2013.01); *H04W 24/10* (2013.01); *H04W 76/10* (2018.02)

(58) Field of Classification Search
CPC ....... H04W 24/10; H04W 4/02; H04W 64/00; H04W 24/08; H04W 4/80; H04W 84/12;
(Continued)

(56) References Cited

U.S. PATENT DOCUMENTS 12,248,059 B2 * 3/2025 Kim ...................... G01S 13/765
2023/0086144 A1 3/2023 Roy et al.
(Continued)

FOREIGN PATENT DOCUMENTS

WO WO-2022031856 A1 2/2022

OTHER PUBLICATIONS

Du R., et al., "An Overview on IEEE 802.11bf: WLAN Sensing", arXiv:2207.04859v1 [cs.NI], arxiv.org, Cornell University Library, 201 Olin Library Cornell University Ithaca, NY 14853, Jul. 11, 2022, pp. 1-23, XP091268635, p. 8, Section B, Subsections 2) -4), figures 5,6.
(Continued)

*Primary Examiner* — Eva Y Puente
(74) *Attorney, Agent, or Firm* — Holland & Hart LLP

(57) ABSTRACT

This disclosure provides methods, components, devices and systems for radio frequency sensing control for an ultra-wideband system. Some aspects more specifically relate to setting up one or more sensing instances (sensing rounds) for one or more respective sensing operations. In some implementations, a first wireless device (for example a controller, an initiator) may transmit a sensing session setup request frame that indicates a set of parameters for the one or more sensing instances. For each of the sensing instances, the first wireless device may transmit a sensing control information element that includes at least a common sensing control configuration and a channel impulse response report configuration. The first wireless device may participate in the sensing operations with at least a second wireless device (for example one or more responders or controlees) during the respective sensing instances.

36 Claims, 15 Drawing Sheets

(58) Field of Classification Search
CPC ..... H04W 24/02; H04W 4/023; H04W 72/20;
H04L 25/0212; H04L 5/00; H04L
25/0224; H04L 25/02; H04L 5/0048;
H04L 5/0053; H04L 25/0204; H04L
25/0216; G01S 13/003; G01S 7/415;
G01S 7/006; G01S 13/56; G01S 13/765;
G01S 13/0209; G01S 5/0273; G01S
5/0278; G01S 7/417
See application file for complete search history.

(56) References Cited

U.S. PATENT DOCUMENTS

2023/0319811 A1* 10/2023 Jain ........................ H04B 1/69
2023/0388840 A1* 11/2023 Au .......................... G01S 13/56

OTHER PUBLICATIONS

International Search Report and Written Opinion—PCT/US2024/024899—ISA/EPO—Aug. 16, 2024.
Pakrooh P (Qualcomm)., et al., "Discussion on UWB Sensing Report", doc.: IEEE 802.15-22-0170-00-04ab, IEEE-SA Mentor, Piscataway, NJ USA, vol. 802.15.4ab, Mar. 10, 2022, pp. 1-13, Mar. 8, 2022, XP068189545, p. 12.
Pakrooh P (Qualcomm)., et al., "Latest Consensus on UWB Sensing for 802.15.4ab", doc.: 15-23-0284-00-04ab, IEEE-SA Mentor, Piscataway, NJ USA, vol. 802.15.4ab, May 18, 2023, pp. 1-27, XP068203481, pp. 3, 15, 20, 25, 26.
Peng X (Huawei)., et al., "UWB Sensing Technical Framework Proposal", IEEE P802.15-22-0538-00-004ab, IEEE-SA Mentor, Piscataway, NJ USA, vol. 802.15.4ab, No. 1, Oct. 11, 2022, 7 Pages, XP068198411, Sections 1.3.1, 1.4, 1.4.1, 1.5, 1.5.1.

* cited by examiner

RADIO FREQUENCY SENSING CONTROL FOR AN ULTRA-WIDEBAND SYSTEM

CROSS REFERENCE

The present Application for patent claims the benefit of U.S. Provisional Patent Application No. 63/502,117 by PAKROOH et al., entitled "RADIO FREQUENCY SENSING CONTROL FOR AN ULTRA-WIDEBAND SYSTEM," filed May 14, 2023, assigned to the assignee hereof, and expressly incorporated by reference herein.

TECHNICAL FIELD

This disclosure relates to wireless communication and, more specifically, to radio frequency (RF) sensing control for an ultra-wideband (UWB) system.

DESCRIPTION OF THE RELATED TECHNOLOGY

A wireless local area network (WLAN) may be formed by one or more wireless access points (APs) that provide a shared wireless communication medium for use by multiple client devices also referred to as wireless stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

In some WLANs, two or more wireless devices may exchange signaling to perform sensing and measure a channel impulse response (CIR) between the two or more wireless devices.

SUMMARY

The systems, methods, and devices of this disclosure each have several innovative aspects, no single one of which is solely responsible for the desirable attributes disclosed herein.

One innovative aspect of the subject matter described in this disclosure can be implemented in a first wireless communication device. The first wireless device may include at least one memory and at least one processor communicatively coupled with the at least one memory. The instructions may be executable by the processor to cause the first wireless device to transmit a sensing session setup request frame that indicates a set of parameters for one or more sensing instances, where the one or more sensing instances are associated with operation of the first wireless device and at least a second wireless device in a UWB system, transmit, for each of the one or more sensing instances, a sensing control information element that includes at least a common sensing control configuration and a CIR report configuration, and participate in one or more respective sensing operations during the one or more sensing instances.

Another innovative aspect of the subject matter described in this disclosure can be implemented in a method for wireless communication performable at a first wireless device. The method may include transmitting a sensing session setup request frame that indicates a set of parameters for one or more sensing instances, where the one or more sensing instances are associated with operation of the first wireless device and at least a second wireless device in an ultra-wideband (UWB) system, transmitting, for each of the one or more sensing instances, a sensing control information element that includes at least a common sensing control configuration and a channel impulse response (CIR) report configuration, and participating in one or more respective sensing operations during the one or more sensing instances.

Another innovative aspect of the subject matter described in this disclosure can be implemented in an apparatus for wireless communication at a first wireless device. The apparatus may include means for transmitting a sensing session setup request frame that indicates a set of parameters for one or more sensing instances, where the one or more sensing instances are associated with operation of the first wireless device and at least a second wireless device in a UWB system, means for transmitting, for each of the one or more sensing instances, a sensing control information element that includes at least a common sensing control configuration and a CIR report configuration, and means for participating in one or more respective sensing operations during the one or more sensing instances.

Another innovative aspect of the subject matter described in this disclosure can be implemented in a non-transitory computer-readable medium storing code for wireless communication at a first wireless communication device. The code may include instructions executable by a processor to transmit a sensing session setup request frame that indicates a set of parameters for one or more sensing instances, where the one or more sensing instances are associated with operation of the first wireless device and at least a second wireless device in a UWB system, transmit, for each of the one or more sensing instances, a sensing control information element that includes at least a common sensing control configuration and a CIR report configuration, and participate in one or more respective sensing operations during the one or more sensing instances.

In some examples of the methods and wireless communication devices, the sensing control information element includes a common sensing control present field that indicates a presence of the common sensing control configuration in the sensing control information element and a CIR report parameters present field that indicates a presence of the CIR report configuration in the sensing control information element.

In some implementations, the methods and wireless communication devices may further include operations, features, means, or instructions for participating, based on participating in the one or more respective sensing operations, in communication of a CIR report in accordance with the CIR report configuration.

In some implementations, the methods and wireless communication devices may further include operations, features, means, or instructions for receiving, based on transmitting the sensing session setup request frame, a sensing session response frame, where the sensing session response frame indicates an acceptance of the set of parameters indicated in the sensing session setup request frame.

One innovative aspect of the subject matter described in this disclosure can be implemented in a first wireless communication device. The first wireless device may include at least one memory and at least one processor communicatively coupled with the at least one memory. The instructions may be executable by the processor to cause the first wireless device to receive a sensing session setup request frame that indicates a set of parameters for one or more sensing instances, where the one or more sensing instances are associated with operation of the first wireless device and at least a second wireless device in a UWB system, receive, for each of the one or more sensing instances, a sensing control information element that includes at least a common sensing control configuration and a CIR report configuration, and participate in one or more respective sensing operations during the one or more sensing instances.

Another innovative aspect of the subject matter described in this disclosure can be implemented in a method for wireless communication performable at a first wireless device. The method may include receiving a sensing session setup request frame that indicates a set of parameters for one or more sensing instances, where the one or more sensing instances are associated with operation of the first wireless device and at least a second wireless device in a UWB system, receiving, for each of the one or more sensing instances, a sensing control information element that includes at least a common sensing control configuration and a CIR report configuration, and participating in one or more respective sensing operations during the one or more sensing instances.

Another innovative aspect of the subject matter described in this disclosure can be implemented in an apparatus for wireless communication at a first wireless device. The apparatus may include means for receiving a sensing session setup request frame that indicates a set of parameters for one or more sensing instances, where the one or more sensing instances are associated with operation of the first wireless device and at least a second wireless device in a UWB system, means for receiving, for each of the one or more sensing instances, a sensing control information element that includes at least a common sensing control configuration and a CIR report configuration, and means for participating in one or more respective sensing operations during the one or more sensing instances.

Another innovative aspect of the subject matter described in this disclosure can be implemented in a non-transitory computer-readable medium storing code for wireless communication at a first wireless communication device. The code may include instructions executable by a processor to receive a sensing session setup request frame that indicates a set of parameters for one or more sensing instances, where the one or more sensing instances are associated with operation of the first wireless device and at least a second wireless device in a UWB system, receive, for each of the one or more sensing instances, a sensing control information element that includes at least a common sensing control configuration and a CIR report configuration, and participate in one or more respective sensing operations during the one or more sensing instances.

In some examples of the methods and wireless communication devices, the sensing control information element includes a common sensing control present field that indicates a presence of the common sensing control configuration in the sensing control information element and a CIR report parameters present field that indicates a presence of the CIR report configuration in the sensing control information element.

In some implementations, the methods and wireless communication devices may further include operations, features, means, or instructions for participating, based on participating in the one or more respective sensing operations, in communication of a CIR report in accordance with the CIR report configuration.

In some implementations, the methods and wireless communication devices may further include operations, features, means, or instructions for transmitting, based on transmitting the sensing session setup request frame, a sensing session response frame, where the sensing session response frame indicates an acceptance of the set of parameters indicated in the sensing session setup request frame.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
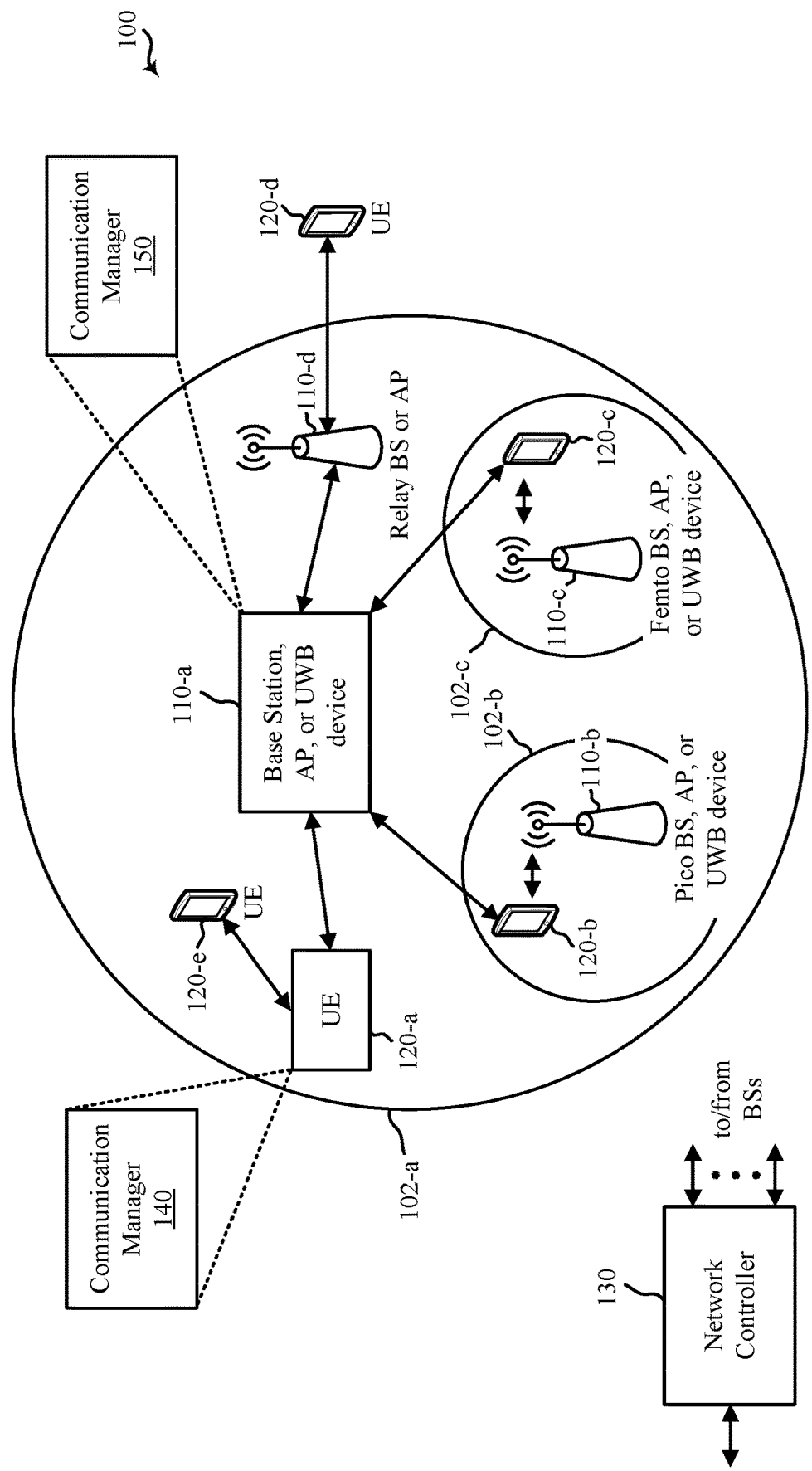
FIG. 1 shows a pictorial diagram of an example wireless communication network.

The following description is directed to some particular examples for the purposes of describing innovative aspects of this disclosure. However, a person having ordinary skill in the art will readily recognize that the teachings herein can be applied in a multitude of different ways. Some or all of the described examples may be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described examples can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), spatial division multiple access (SDMA), rate-splitting multiple access (RSMA), multi-user shared access (MUSA), single-user (SU) multiple-input multiple-output (MIMO) and multi-user (MU)-MIMO. The described examples also can be implemented using other wireless communication protocols or RF signals suitable for use in one or more of a wireless personal area network (WPAN), a wireless local area network (WLAN), a wireless wide area network (WWAN), a wireless metropolitan area network (WMAN), or an internet of things (IoT) network.

Various aspects relate generally to sensing procedures between two wireless devices that communicate in ultra-wide bandwidth (UWB) systems. Some aspects more specifically relate to setting up one or more sensing instances or sensing rounds for one or more respective sensing operations. In some implementations, a first wireless device (for example a controller, an initiator) may transmit a sensing session setup request frame that indicates a set of parameters for the one or more sensing instances. The sensing instances may be associated with operations of the first wireless device in a UWB system. For each of the sensing instances, the first wireless device may transmit a sensing control information element that includes at least a common sensing control configuration and a channel impulse response (CIR) report configuration. The common sensing control configuration may include fields that specify a configuration of a sensing operation during a sensing instance (for example whether the sensing operation is mono-static, bi-static, or multi-static, whether a responder is a transmitting or receiving device, and other parameters), and the CIR report configuration may specify one or more parameters associated with a CIR report transmitted to the first wireless device at the end of a sensing instance. The first wireless device may participate in one or more respective sensing operations during the one or more sensing instances with at least a second device (for example one or more responders or controlees), which may include communicating one or more CIR reports.

Particular aspects of the subject matter described in this disclosure can be implemented to realize one or more of the following potential advantages. In some implementations, by supporting a sensing session setup request frame that indicates a set of parameters for sensing instances, the described techniques may be used to support accurate sensing measurements in a UWB system. In addition, the information element design for UWB sensing control, as described herein, may enable communication of sensing configuration parameters between UWB devices participating in the sensing. This may allow for compressed message size based on enabling efficient bit allocation for different features. Further, the described techniques may support a sensing control information element that enables a configuration of a sensing operation and a CIR report, which may improve and simplify sensing measurements (specifically, CIR measurements) for UWB devices. Such systems may accordingly experience more accurate sensing (as wider bandwidth sensing signaling may provide more accurate sensing-related information), higher data rates, and greater spectral efficiency, among other benefits.

FIG. 1 shows a pictorial diagram of an example wireless communication network 100. The wireless communication network 100 may be or may include elements of a 5G (such as NR) network, a 4G (such as Long Term Evolution (LTE)) network, wide area network (WAN) access points (APs), personal area network (PAN) access points and devices, or UWB devices (such as UWB anchor, UWB tag), among other examples. The wireless communication network 100 may include one or more network entities, such as a base station, AP, or UWB device 110 (shown as BS, AP, or UWB device 110-a, pico BS, AP, or UWB device 110-b, femto BS, AP, or UWB device 110-c, and a relay BS, AP, or UWB device 110-d). The wireless communication network 100 also may include a user equipment (UE) 120 or multiple UEs 120 (shown as a UE 120-a, a UE 120-b, a UE 120-c, a UE 120-d, and a UE 120-e). A base station, AP, or UWB device 110 is a network entity that communicates with UEs 120. A base station (sometimes referred to as a BS) may include, for example, an NR base station, an LTE base station, a Node B, an eNB (such as in 4G), a gNB (such as in 5G), and/or a transmission reception point (TRP). Each base station, AP, or UWB device 110 may provide communication coverage for a particular geographic area. In the Third Generation Partnership Project (3GPP), the term "cell" can refer to a coverage area of a base station, AP, or UWB device 110 and/or a base station subsystem serving this coverage area, depending on the context in which the term is used.

In some aspects, the term "base station" or "network entity" may refer to an aggregated base station, a disaggregated base station, an integrated access and backhaul (IAB) node, a relay node, and/or one or more components thereof. For example, in some aspects, "base station" or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station" or "network entity" may refer to one device configured to perform one or more functions, such as those described herein in connection with the base station. In some aspects, the term "base station" or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station" or "network entity" may refer to any one or more of those different devices. In some aspects, the term "base station" or "network entity" may refer to one or more virtual base stations and/or one or more virtual base station functions. For example, in some aspects, two or more base station functions may be instantiated on a single device. In some aspects, the term "base station" or "network entity" may refer to one of the base station functions and not another. In this way, a single device may include more than one base station. A WAN access point, a PAN access point, a UWB device (such as UWB anchor, UWB tag, or other form of a UWB-capable device), and a UWB access point also may be referred to as a "network entity." A network entity may include components described for the base station, AP, or UWB device 110.

A base station, AP, or UWB device 110 may provide communication coverage for a macro cell, a pico cell, a femto cell, and/or another type of cell. A macro cell may cover a relatively large geographic area (such as several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (such as a home) and may allow restricted access by UEs 120 having association with the femto cell (such as UEs 120 in a closed subscriber group (CSG)). A base station for a macro cell may be referred to as a macro base station. A base station for a pico cell may be referred to as a pico base station. A base station for a femto cell may be referred to as a femto base station or an in-home base station. In the example shown in FIG. 1, the BS, AP, or UWB device 110-*a* may be a macro base station, AP, or UWB device for a macro cell 102-*a*, the BS, AP, or UWB device 110-*b* may be a pico base station, AP, or UWB device for a pico cell 102-*b*, and the BS, AP, or UWB device 110-*c* may be a femto base station, AP, or UWB device for a femto cell 102-*c*. A base station may support one or multiple (such as three) cells. A network entity may be a macro base station, a pico base station, or a femto base station.

In some implementations, a cell may not necessarily be stationary, and the geographic area of the cell may move according to the location of a base station that is mobile (such as a mobile base station). In some implementations, the base stations, APs, or UWB devices 110 may be interconnected to one another and/or to one or more other base stations, Aps, or UWB devices 110 or network entities (not shown) in the wireless communication network 100 through various types of backhaul interfaces, such as a direct physical connection or a virtual network, using any suitable transport network.

The wireless communication network 100 may include one or more relay stations. A relay station is an entity that can receive a transmission of data from an upstream station (such as a network entity or a UE 120) and send a transmission of the data to a downstream station (such as a UE 120 or a network entity). A relay station may be a UE 120 that can relay transmissions for other UEs 120. In the example shown in FIG. 1, the BS, AP, or UWB device 110-*d* (such as a relay base station) may communicate with the BS, AP, or UWB device 110-*a* (such as a macro base station, AP, UWB device) and the UE 120-*d* in order to facilitate communication between the BS, AP, or UWB device 110-*a* and the UE 120-*d*. A base station that relays communications may be referred to as a relay station, a relay base station, a relay, or the like.

The wireless communication network 100 may be a heterogeneous network that includes base stations of different types, such as macro base stations, pico base stations, femto base stations, relay base stations, or the like. These different types of base stations, different types of APs, or different types of UWB devices may have different transmit power levels, different coverage areas, and/or different impacts on interference in the wireless communication network 100. For example, macro base stations, APs, or UWB devices may have a high transmit power level (such as 5 to 40 watts) whereas pico base stations, APs, or UWB devices, femto base stations, APs, or UWB devices, and relay base stations, APs, or UWB devices may have lower transmit power levels (such as 0.1 to 2 watts).

A network controller 130 may couple to or communicate with a set of network entities and may provide coordination and control for these network entities. The network controller 130 may communicate with the network entities via a backhaul communication link. The network entities may communicate with one another directly or indirectly via a wireless or wireline backhaul communication link.

The UEs 120 may be dispersed throughout the wireless communication network 100, and each UE 120 may be stationary or mobile. A UE 120 may include, for example, an access terminal, a terminal, a mobile station, and/or a subscriber unit. A UE 120 may be a cellular phone (such as a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (such as a smart watch, smart clothing, smart glasses, a smart wristband, smart jewelry (such as a smart ring or a smart bracelet)), an entertainment device (such as a music device, a video device, and/or a satellite radio), a vehicular component or sensor, a smart meter/sensor, industrial manufacturing equipment, a global positioning system device, and/or any other suitable device that is configured to communicate via a wireless medium. A UE 120 may be capable of UWB communications.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (such as a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some implementations, the processor components and the memory components may be coupled together. For example, the processor components (such as one or more processors) and the memory components (such as a memory) may be operatively coupled, communicatively coupled, electronically coupled, and/or electrically coupled.

In general, any number of wireless communication networks 100 may be deployed in a given geographic area. Each wireless communication network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some examples, NR or 5G RAT networks may be deployed. In some examples, WANs, PANs, or UWB networks may be deployed.

In some implementations, two or more UEs 120 (such as shown as UE 120-*a* and UE 120-*c*) may communicate directly using one or more sidelink channels (such as without using a network entity as an intermediary to communicate with one another). For example, the UEs 120 may communicate using peer-to-peer (P2P) communications, device-to-device (D2D) communications, a vehicle-to-everything (V2X) protocol (such as which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station, AP, or UWB device 110.

Devices of the wireless communication network 100 may communicate using the electromagnetic spectrum, which may be subdivided by frequency or wavelength into various classes, bands, channels, or the like. For example, devices of the wireless communication network 100 may communicate using one or more operating bands. A UWB frequency bandwidth may be greater than 500 MHZ. In 5G NR, two initial operating bands have been identified as frequency range designations FR1 (410 MHZ-7.125 GHZ) and FR2 (24.25 GHz-52.6 GHZ). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHZ. For example, three higher operating bands have been identified as frequency range designations FR4a or FR4-1 (52.6 GHZ-71 GHz), FR4 (52.6 GHZ-114.25 GHZ), and FR5 (114.25 GHZ-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHZ, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (such as FR1, FR2, FR3, FR4, FR4-a, FR4-1, and/or FR5) may be modified, and techniques described herein are applicable to those modified frequency ranges.

In some aspects, a responding device (such as a UE 120, a network entity) may include a communication manager 140 or 150. As described in more detail elsewhere herein, the communication manager 140 or 150 may receive a signal from an initiating device and estimate, from the signal, a channel impulse response (CIR) that represents signal reflections from one or more objects as multiple taps; and select one or more taps from the multiple taps based at least in part on a configuration for providing consistent CIR reports. The communication manager 140 or 150 may transmit, to the initiating device, a CIR report that indicates the one or more taps.

In some aspects, an initiating device (such as a UE 120, a network entity) may include a communication manager 140 or 150. As described in more detail elsewhere herein, the communication manager 140 or 150 may transmit a signal that includes multiple packets; and receive, from a responding device, a CIR report for each packet of the multiple packets. The communication manager 140 or 150 may align, using one or more taps in the CIR report for each packet, the CIR reports across the multiple packets to identify a target object, a location of the target object, or a movement of the target object. The communication manager 140 or 150 may perform an action based at least in part on the target object, the location of the target object, or the movement of the target object. Additionally, or alternatively, the communication manager 140 or 150 may perform one or more other operations described herein.

As indicated above, FIG. 1 is provided as an example. Other examples may differ from what is described with regard to FIG. 1.

Figure 2:
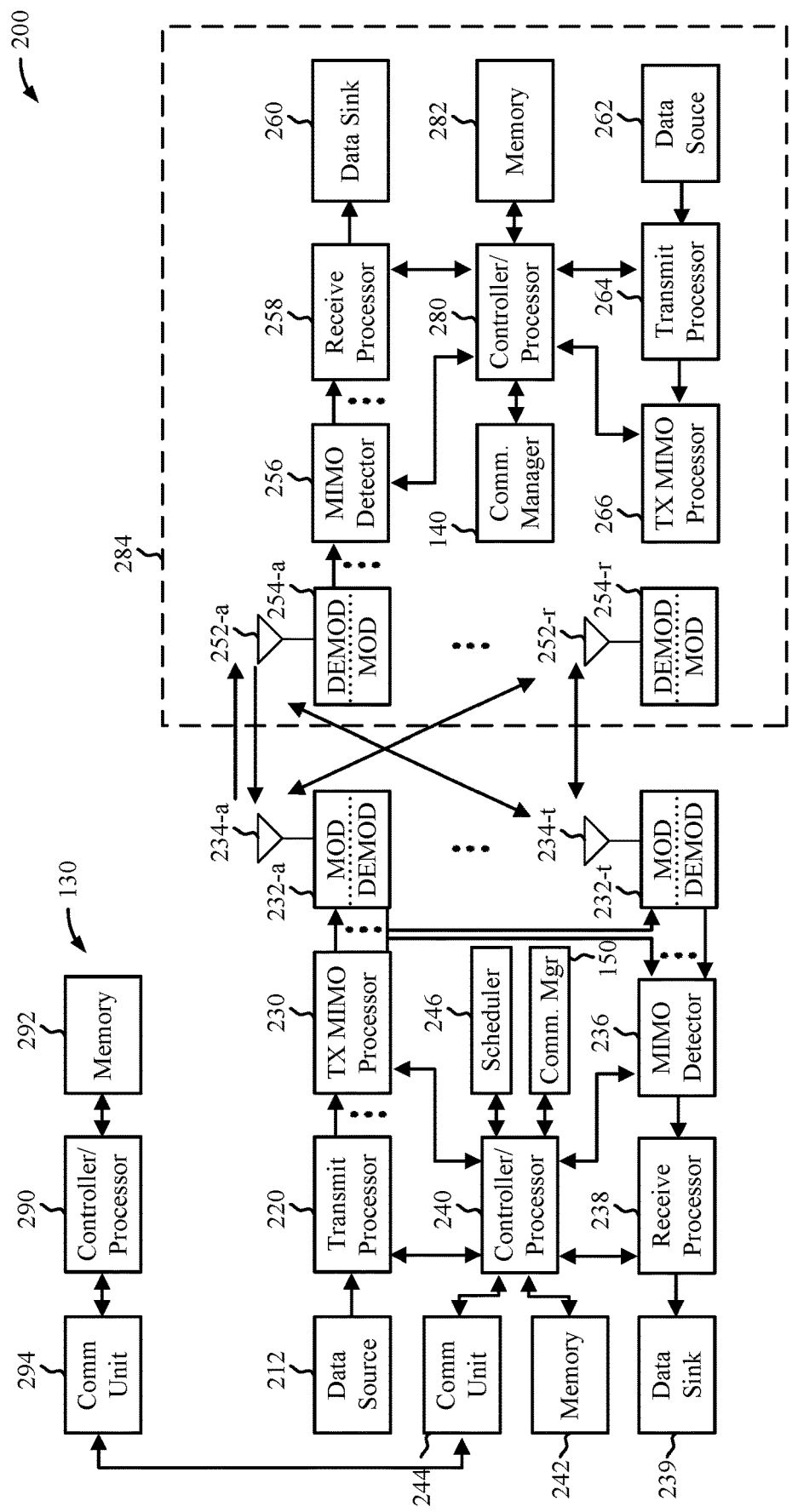
FIG. 2 shows an example protocol data unit (PDU) usable for communications between ultra-wideband (UWB) devices.

FIG. 2 shows an example 200 of a network entity (such as base station, AP, or UWB device 110 in communication with a UE 120 in a wireless communication network 100, in accordance with the present disclosure. The base station, AP, or UWB device 110 may be equipped with a set of antennas 234-a through 234-t, such as T antennas (T≥1). The UE 120 may be equipped with a set of antennas 252-a through 252-r, such as R antennas (R≥1). A WAN access point also may include components as described for the base station, AP, or UWB device 110 and also may operate in accordance with Institute of Electrical Engineers (IEEE) standards (such as IEEE 802).

At the base station, AP, or UWB device 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station, AP, or UWB device 110 may process (such as encode and modulate) the data for the UE 120 based at least in part on the MCS(s) selected for the UE 120 and may provide data symbols for the UE 120. The transmit processor 220 may process system information (such as for semi-static resource partitioning information (SRPI)) and control information (such as CQI requests, grants, and/or upper layer signaling) and provide overhead symbols and control symbols. The transmit processor 220 may generate reference symbols for reference signals (such as a cell-specific reference signal (CRS) or a demodulation reference signal (DMRS)) and synchronization signals (such as a primary synchronization signal (PSS) or a secondary synchronization signal (SSS)). A transmit (TX) multiple-input multiple-output (MIMO) processor 230 may perform spatial processing (such as precoding) on the data symbols, the control symbols, the overhead symbols, and/or the reference symbols, if applicable, and may provide a set of output symbol streams (such as T output symbol streams) to a corresponding set of modems 232 (such as T modems), shown as modems 232-a through 232-t. For example, each output symbol stream may be provided to a modulator component (shown as MOD) of a modem 232. Each modem 232 may use a respective modulator component to process a respective output symbol stream (such as for OFDM) to obtain an output sample stream. Each modem 232 may further use a respective modulator component to process (such as convert to analog, amplify, filter, and/or upconvert) the output sample stream to obtain a downlink signal. The modems 232-a through 232-t may transmit a set of downlink signals (such as T downlink signals) via a corresponding set of antennas 234 (such as T antennas), shown as antennas 234-a through 234-t.

At the UE 120, a set of antennas 252 (shown as antennas 252-a through 252-r) may receive the downlink signals from the base station AP, or UWB device 110 and/or other base stations, Aps, or UWB devices 110 and may provide a set of received signals (such as R received signals) to a set of modems 254 (such as R modems), shown as modems 254-a through 254-r. For example, each received signal may be provided to a demodulator component (shown as DEMOD) of a modem 254. Each modem 254 may use a respective demodulator component to condition (such as filter, amplify, downconvert, and/or digitize) a received signal to obtain input samples. Each modem 254 may use a demodulator component to further process the input samples (such as for OFDM) to obtain received symbols. A MIMO detector 256 may obtain received symbols from the modems 254, may perform MIMO detection on the received symbols if applicable, and may provide detected symbols. A receive processor 258 may process (such as demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some implementations, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network entity via the communication unit 294.

One or more antennas (such as antennas 234-*a* through 234-*t* and/or antennas 252-*a* through 252-*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (such as for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (such as for DFT-s-OFDM or CP-OFDM), and transmitted to the network entity. In some implementations, the modem 254 of the UE 120 may include a modulator and a demodulator. In some implementations, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (such as the controller/processor 280) and the memory 282 to perform aspects of any of the methods described herein (such as with reference to FIGS. 3-9).

At the network entity (such as base station, AP, or UWB device 110), the uplink signals from UE 120 and/or other UEs may be received by the antennas 234, processed by the modem 232 (such as a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network entity may include a communication unit 244 and may communicate with the network controller 130 via the communication unit 244. The network entity may include a scheduler 246 to schedule one or more UEs 120 for downlink and/or uplink communications. In some implementations, the modem 232 of the network entity may include a modulator and a demodulator. In some implementations, the network entity includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (such as the controller/processor 240) and the memory 242 to perform aspects of any of the methods described herein (such as with reference to FIGS. 3-9).

A controller/processor of a network entity (such as the controller/processor 240 of the base station, AP, or UWB device 110), the controller/processor 280 of the UE 120, and/or any other component(s) of FIG. 2 may perform one or more techniques associated with RF sensing, as described in more detail elsewhere herein. For example, the controller/processor 240 of the base station, AP, or UWB device 110, the controller/processor 280 of the UE 120, and/or any other component(s) of FIG. 2 may perform or direct operations of, for example, the process of FIG. 10 and/or other processes as described herein. The memory 242 and the memory 282 may store data and program codes for the network entity and the UE 120, respectively. In some implementations, the memory 242 and/or the memory 282 may include a non-transitory computer-readable medium storing one or more instructions (such as code and/or program code) for wireless communication. For example, the one or more instructions, when executed (such as directly, or after compiling, converting, and/or interpreting) by one or more processors of the network entity and/or the UE 120, may cause the one or more processors, the UE 120, and/or the network entity to perform or direct operations of, for example, the process of FIG. 6, the process of FIG. 7, and/or other processes as described herein. In some implementations, executing instructions may include running the instructions, converting the instructions, compiling the instructions, and/or interpreting the instructions, among other examples.

In some aspects, a responding device (such as a UE 120, a network entity) includes means for receiving a signal from an initiating device and means for estimating, from the signal, a CIR that represents signal reflections from one or more objects as multiple taps; means for selecting one or more taps from the multiple taps based at least in part on a configuration for providing consistent CIR reports; and/or means for transmitting, to the initiating device, a CIR report that indicates the one or more taps. In some aspects, the means for the responding device to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246. In some aspects, the means for the responding device to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, an initiating device (such as a UE 120, a network entity) includes means for transmitting a signal that includes multiple packets; means for receiving, from a responding device, a CIR report for each packet of the multiple packets; means for aligning, using one or more taps in the CIR report for each packet, the CIR reports across the multiple packets to identify a target object, a location of the target object, or a movement of the target object; and/or means for performing an action based at least in part on the target object, the location of the target object, or the movement of the target object. In some aspects, the means for the initiating device to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246. In some aspects, the means for the initiating device to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
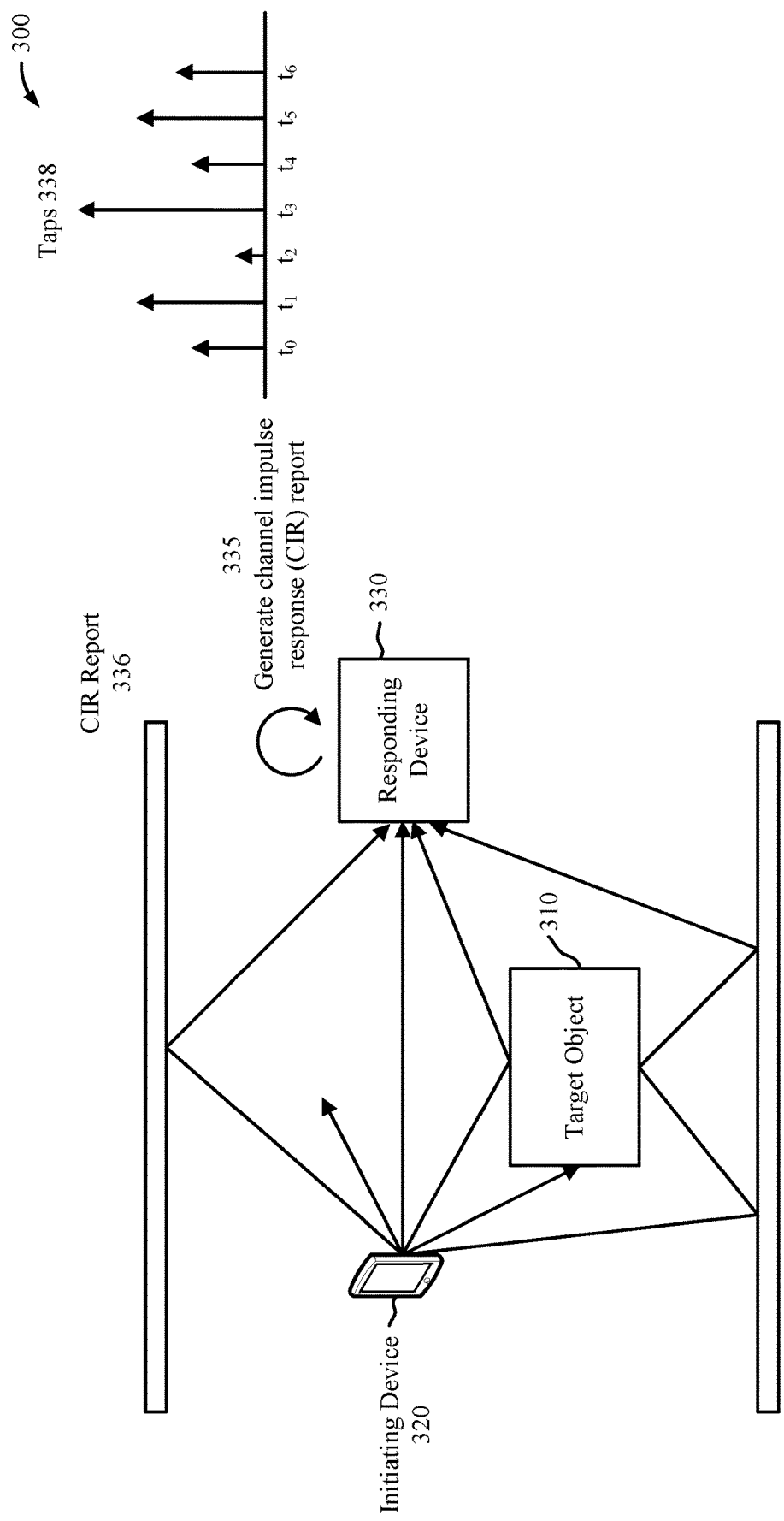
FIG. 3 shows an example of radio frequency (RF) sensing between UWB devices.

FIG. 3 shows an example 300 of RF sensing. RF sensing may be used to identify a target object 310. Example 300 shows an example of bi-static one-way sensing. An initiating device 320 (such as a UE 120, a network entity) may transmit a signal that is reflected off of the target object 310 (such as a user, another human, a body part, an animal, a robot) and other surfaces. A responding device 330 (such as a UE 120, a network entity) may receive the direct signal and reflections of the signal. The responding device 330 may estimate, from the signal, a CIR. While a direct signal may be received, RF sensing may focus on reflected signals and may distinguish reflected signals from the direct signal by strength, time, or other information. The CIR may represent or characterize signal reflections from one or more objects as one or more taps. Taps may indicate a signal strength of reflected signals received at different points in time (such as t0, t1, and so forth). As shown by FIG. 3 and by reference number 335, the responding device 330 may generate a CIR report 336 (such as CIR measurement report) that includes one or more of the taps 338. The responding device 330 may transmit the CIR report 336 to the initiating device 320, and the initiating device 320 may identify the target object 310 from the taps 338 of the CIR report 336.

RF sensing has different requirements than wireless communications. In IEEE standard 802.15, UWB data communication does not rely on any channel consistency from one packet to the next. However, for UWB ranging, inconsistent channel measurements from one packet to the next may cause the CIR report 336 for multiple packets to involve what appear to be random taps. As a result, the CIR report 336 may not be useful for RF sensing applications. RF sensing makes inferences about the changes in the environment by measuring changes in the wireless channels. If consistent CIR measurement and reporting is not fulfilled, a wireless device may determine that changes in the measured and reported wireless channel are due to changes in the physical environment and not due to the wireless device itself.

According to various aspects described herein, the responding device 330 may select one or more reference taps that the initiating device 320 may use to align the CIR report 336 from each of multiple packets. A tap may refer to an energy rise in the channel impulse response at a point in time or at an occasion that may indicate a direct or reflected signal. A tap may appear for detected energy that is not part of a direct or reflected signal and may be due to interfering energy or other noise. The aligning of CIR reports may include aligning CIR reports at least in time. This may include, for example, identifying taps (such as that satisfy a threshold) in a first CIR report that occur at the same times or occasions as taps in a second CIR report, such that a tap for a direct or reflected signal in the first CIR report is matched to a tap for the same direct or reflected signal in the second CIR report. By aligning the CIR reports, the initiating device 320 may better identify the target object 310, movement of the target object 310, or other properties of the target object 310. The initiating device 320 may take more appropriate action with better identification of the target object 310 and conserve processing resources and signaling resources. For example, the initiating device may better detect a location of a body part of a user (such as human, robot, autonomous device), detect user activity (such as gesture or breathing pattern of human or animal), identify an object near the user, or detect movement of objects around the user, among other RF sensing uses.

As shown in example 300 of FIG. 3, the initiating device 320 may transmit a signal, and the responding device 330 may receive reflections of the signal off of one or more objects, including the target object 310.

In some aspects, the responding device 330 may be configured (such as by the initiating device 320, by another device, or at production) to select one or more reference points to provide in the CIR report 336. A reference point may be an earliest tap, a strongest tap, a center of mass of taps, a packet detection time, or any other specified tap or time point. The responding device 330 may use a configuration for providing consistent CIR reports. Consistent CIR reports may be CIR reports that together work to provide accurate RF sensing information for objects. Consistent CIR reports may include CIR reports with information (such as taps, reference points) that the initiating device may use to align the CIR reports in time in order to match reflected signals to objects over time, in order to identify objects when movement is involved. The configuration may specify which taps to select for a CIR report, including how many taps before or after a reference point or how long before or after the reference point to collect taps.

Figure 4:
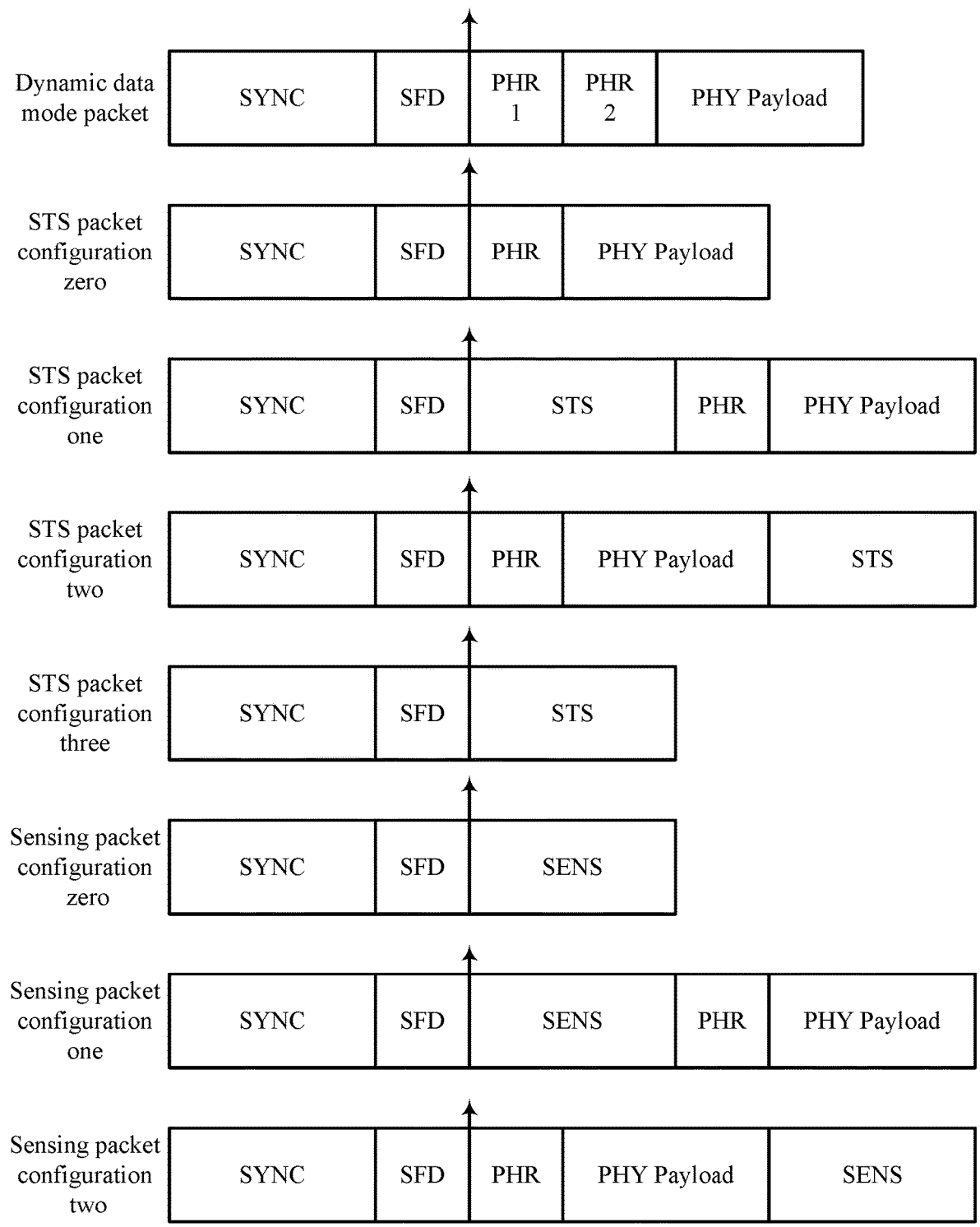
FIG. 4 shows an example PPDU usable for communications between UWB devices.

FIG. 4 shows an example 400 of a PPDU usable for communications between UWB devices. UWB wireless devices (such as including an initiator and one or more responders) may communicate in UWB systems using relatively low power, which may be useful for applications such as secure ranging, sensing (for example presence detection), and high-data rate communications, among other applications.

In some implementations, an initiator may transmit different frame structures (example, PPDUs) for UWB communications, where the frame structures may include different fields used for specific functionalities. For example, such PPDUs may include different combinations of a synchronization (SYNC) field, a start of frame delimiter (SFD) field, one or more physical layer (PHY) fields, a PHY payload field, a scrambled timestamp sequence (STS) field, or a sensing (SENS) field.

A SYNC field, included at the beginning of a UWB packet (also referred to as the frame or PPDU described herein) may be used for synchronization between the wireless devices (an initiator and one or more responders). In addition, the UWB packet may include an SFD field for timestamping a transmission, which may be useful for ranging. In some implementations, the UWB packet may include one or more PHR fields (such as a PHR 1, a PHR 2, a PHR field) that may provide PHY information to the one or more responders (for example information about a payload). Additionally, or alternatively, the UWB packet may include a PHY payload field, a scrambled timestamp sequence STS field, or both. The PHY payload field may carry actual data (for example data bits), timestamp information, or other data. The STS field may provide additional information that may improve accuracy of ranging measurements. In addition, a SENS field of a UWB packet may provide a proper sequence and waveform for high quality RF sensing. In some implementations, the UWB packet may include both payload and SENS fields.

In some implementations, the UWB packet may include a SENS field for scheduling and control of a sensing session between the wireless devices. Sensing may occur in a mono-static, bi-static, or multi-static manner. For example, in a monostatic sensing operation (an example described herein with reference to FIG. 3), a single wireless device (such as a wireless device acting as an initiator and an responder) may transmit a UWB frame, receive a reflection of the UWB packet off of an object (such as a target or a reflector), and estimate characteristics of that object (such as movement, a presence or absence of the object, how far away the object is located from the wireless device, and other characteristics).

Alternatively, in a bi-static or multi-static sensing operation, two or more wireless devices may participate in a sensing operation. In such implementations, a first wireless device may be an initiator and a second wireless device may be an responder, or the second wireless device may be the initiator and the first wireless device may be the responder. For example, as an initiator, the first wireless device may transmit a UWB packet, which may reflect off an object for reception by the second wireless device as an responder such that the second wireless device may estimate the characteristics of the object using sensing.

FIG. 3 shows numerous examples of PPDUs for sensing in a UWB system.

For example, a dynamic data mode packet may include a SYNC field, an SFD field, a PHR 1 field, a PHR 2 field, and a PHY payload. An STS packet configuration zero may include a SYNC field, an SFD field, a PHY field, and a PHY payload field. An STS packet configuration one may include a SYNC field, an SFD field, an STS field, a PHR field, and a PHY payload field. An STS packet configuration two may include a SYNC field, an SFD field, a PHR field, a PHY payload field, and an STS field. An STS packet configuration three may include a SYNC field, an SFD field, and an STS field. In addition, a sensing packet configuration zero may include a SYNC field, an SFD field, and a SENS field. A sensing packet configuration one may include a SYNC field, an SFD field, a SENS field, a PHR field, and a PHY payload field. A sensing packet configuration two may include a SYNC field, an SFD field, a PHR field, a PHY payload field, and a SENS field. Other PPDUs or UWB packet formats may be supported.

Figure 5:
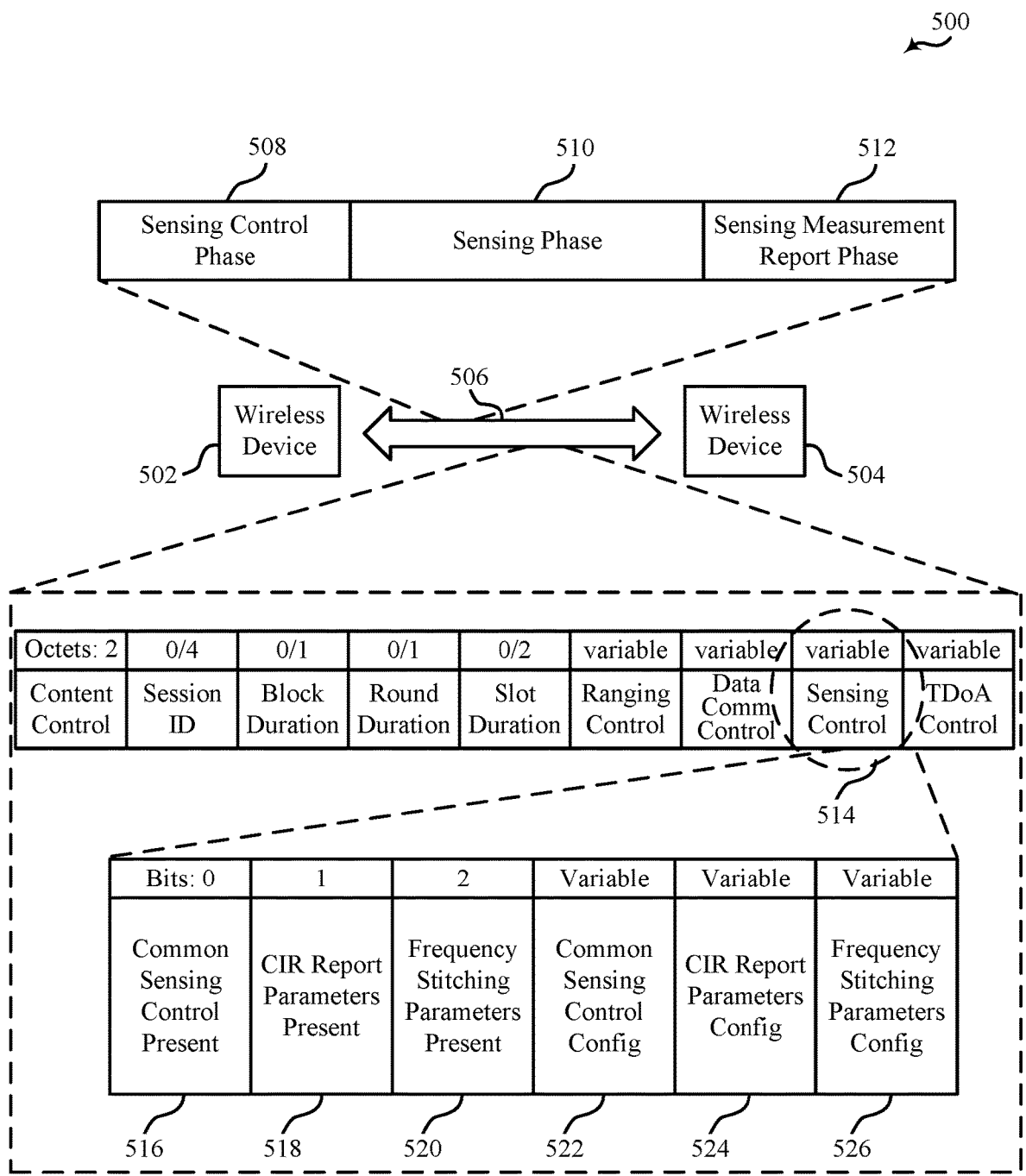
FIG. 5 shows an example of a diagram that supports RF sensing control for UWB system according to some aspects of the present disclosure.

FIG. 5 shows an example of a diagram 500 that supports RF sensing control for a UWB system according to some aspects of the present disclosure. The diagram 500 may implement or be implemented to realize or facilitate aspects of the WLAN 100. For example, the diagram 500 shows communication between a wireless device 502 and a wireless device 504 via a communication link 506, and the wireless device 502 and the wireless device 504 may each be an example of a STA or an AP as shown by and described with reference to FIG. 1. In some implementations, the wireless device 502 and the wireless device 504 may support one or more signaling or messaging designs to support a sensing measurement procedure in a UWB system (using a bandwidth of approximately 500 MHZ). In some aspects, the wireless device 502 may be an initiating wireless device or an initiating STA (ISTA) (also referred to herein as a controller) and the wireless device 504 may be a responding wireless device or a responding STA (RSTA) (also referred to herein as a controlee). Alternatively, the wireless device 504 may be an ISTA and the wireless device 502 may be a RSTA. Further, although referred to as an ISTA or an RSTA, such a role of ISTA or RSTA may be taken by either a STA or an AP.

The wireless devices may communicate in UWB systems using relatively low power, which may be useful for applications such as secure ranging, sensing (for example presence detection), and high-data rate communications, among other applications. As described herein with reference to FIG. 4, the wireless device 502 or the wireless device 504 may transmit different frame structures for UWB communications, where the frame structures may include different fields used for specific functionalities.

In some implementations, the UWB packet may include a SENS field for scheduling and control of a sensing session between the wireless devices. Sensing may occur in a mono-static, bi-static, or multi-static manner. For example, in a monostatic sensing operation, a single wireless device (such as the wireless device 502 acting as an initiator and an responder) may transmit a UWB frame, receive a reflection of the UWB packet off of an object (such as a target or a reflector), and estimate characteristics of that object (such as movement, a presence or absence of the object, how far away the object is located from the wireless device, and other characteristics). Alternatively, in a bi-static or multi-static sensing operation, two or more wireless devices may participate in a sensing operation. In such implementations, the wireless device 502 may be an initiator and the wireless device 504 may be an responder, or the wireless device 504 may be the initiator and the wireless device 502 may be the responder. For example, as an initiator, the wireless device 502 may transmit a UWB frame, which may reflect off an object for reception by the wireless device 504 as an responder such that the wireless device 504 may estimate the characteristics of the object using sensing. To perform the sensing, the wireless device 504 may measure a CIR, which may indicate a channel behavior. That is, because the object or any other reflectors between the wireless devices may add to the CIR of the channel, the wireless device 504 may measure the CIR to understand the environment and changes to the environment including object movement, object ranges, and other environmental information.

To support a sensing measurement procedure, the wireless device 502 and the wireless device 504 may participate in a setup of a sensing session, one or more sensing measurement instances (for example, sensing rounds or measurement rounds), and termination of the sensing session. During session setup, the wireless device 502 (an initiator or controller) may transmit a sensing session setup request frame to the wireless device 504 (a responder or controlee). The sensing session setup request frame may indicate a set of parameters for one or more sensing instances (for example sensing time instances or sensing rounds) of the sensing session. In some implementations, the set of parameters may indicate an RF channel, frequency, time period, and type of packet for which the wireless devices are to perform the sensing, among other parameters. In addition, the sensing session setup request frame may indicate the roles of the wireless device 502 and the wireless device 504, which may be established before the sensing session is initiated. For examples, the sensing session setup request frame may indicate which wireless devices are ISTAs or RSTAs.

The wireless device 504 may transmit a sensing session setup response frame (also referred to herein as a feedback frame) to the wireless device 502 either accepting or rejecting the set of parameters indicated in the sensing session setup request frame. For example, if the wireless device 504 accepts the set of parameters, the sensing session setup response frame may include an acknowledgement (ACK) to indicate the acceptance and the wireless devices may proceed to a sensing measurement phase of the sensing session. Alternatively, if the wireless device 504 rejects the set of parameters, the sensing session setup response frame may indicate a rejection and indicate a second set of operational parameters provided by the wireless device 504. The wireless devices 504 may continue to transmit these sensing session setup request and response frames until they agree on the set of parameters.

The wireless devices may begin a sensing measurement phase of the sensing operation based on agreeing on the set of parameters. The sensing measurement phase may include one or more sensing instances (also referred to herein as sensing measurement instances) during which the wireless devices may perform one or more respective sensing operations, which may include performing CIR measurements of a waveform. Thus, the wireless device 504 (a responder) may generate one CIR measurement per sensing instance. In this way, if the wireless devices intent to perform sensing over a period of time to detect some activity or presence of some objects, the wireless device 502 and the wireless device 504 may utilize a quantity of sensing measurement instances to accurately measure the CIR over time.

Each sensing instance may include a sensing control phase 508, a sensing phase 510, and a sensing measurement report phase 512. In addition, the wireless device 502 and the wireless device 504 may follow a sensing round/block structure similar to that for a ranging operation for the sensing operation. The sensing round/block structure may be based on a sensing block that may include a quantity of N–1 sensing rounds (such as a sensing round 0, a sensing round 1, a sensing round 2, a sensing round 3, . . . , a sensing round N–1). Each sensing round may include a quantity of M–1 sensing slots (such as the sensing round 0 may include a sensing slot 0, a sensing slot 1, a sensing slot 2, a sensing slot 3, . . . , a sensing slot M–1). Based on the sensing round/block structure, a sensing instance may occur during one sensing round (that is, a time duration of one sensing round may be equivalent to a time duration of one sensing instance). In such implementations, the wireless devices may use the sensing slots may for specific functions during a sensing instance, including during the sensing control phase 508, the sensing phase 510, and the sensing measurement report phase 512.

During the sensing control phase 508, the wireless device 502 and the wireless device 504 may update the set of parameters configured via the sensing session setup request frame for a specific sensing instance. For example, the wireless devices may utilize the sensing control phase 508 of the sensing instance to update a channel, packet, or other parameter for which a sensing operation is to be performed during that sensing instance. During the sensing control phase 508 for each of the one or more sensing instances, the wireless device 502 may transmit a sensing control information element 514 to configure the parameters for that sensing instance.

To indicate the sensing control information element 514, the wireless device 502 (the controller or initiator) may transmit an application control (AC) information element to the wireless device 504 during the sensing control phase 508 of each active sensing instance (sensing round). The AC information element may include a set of fields (also referred to herein as information elements) over two octets, the set of fields configuring a ranging operation, a data communication, a sensing operation, or a time difference on arrival (TdoA) operation in a respective instance. For example, the AC information element may include a content control field that indicates what content is to be 25 included in the AC information element and a session identifier (ID) field that indicates an ID associated with a ranging, data communication, sensing, or TdoA session (operation). Additionally, or alternatively, the AC information element may include block, round, and slot duration fields. If the AC information is associated with a sensing session, for example, such fields may indicate a duration (in time) of a sensing block, sensing rounds, and sensing slots for a sensing instance.

In addition, the AC information element may include a set of variable-bit control information elements that enable the wireless devices to indicate or change parameters for a ranging, data communication, sensing, or TdoA session. For example, the AC information element may include a ranging control information element, a data communication control information element, a sensing control information element 514, and a TdoA information element.

The sensing control information element 514 may indicate a set of fields including a common sensing control present field 516, a CIR report parameters present field 518, a frequency stitching parameters present field 520, a common sensing control configuration field 522, a CIR report parameters configuration field 524, and a frequency stitching parameters configuration field 526. The common sensing control present field 516, the CIR report parameters present field 518, and the frequency stitching parameters present field 520 may use a one-bit flag to indicate the presence of the common sensing control configuration field 522, the CIR report parameters configuration field 524, and frequency stitching parameters configuration field 526, respectively. Additional details relating to the common sensing control configuration field 522, the CIR report parameters configuration field 524, and frequency stitching parameters configuration field 526 are shown by and described with reference to FIGS. 6-9.

After the sensing control phase 508, the wireless device 502 and the wireless device 504 may enter the sensing phase 510 of a sensing instance. The sensing phase may begin when the wireless device 502 transmits a physical layer packet (for example a PPDU) of a physical layer packet format type that was agreed upon during the sensing control phase 508. The wireless device 502 may transmit the packet (for example a sequence of waveforms), which reflect off an object or target and be received by the wireless device 504 in a bi-static or multi-static system or by the wireless device 502 in a mono-static system. The wireless device 502 or the wireless device 504 that is the responder may estimate a CIR (or otherwise measure the channel) during the sensing phase 510.

After receiving the packet, the wireless device 502 or the wireless device 504 may report the CIR back to the wireless device 502 (the initiator) during the sensing measurement report phase 512. The wireless device 502 or the wireless device 504 may transmit the CIR report via in-band or out-of-band methods. In addition, the wireless devices may support two types of sensing measurement reports, including a MAC layer management entity report used to transmit sensing measurement results to an application layer of the first wireless device, and an over-the-air CIR measurement report.

Figure 6:
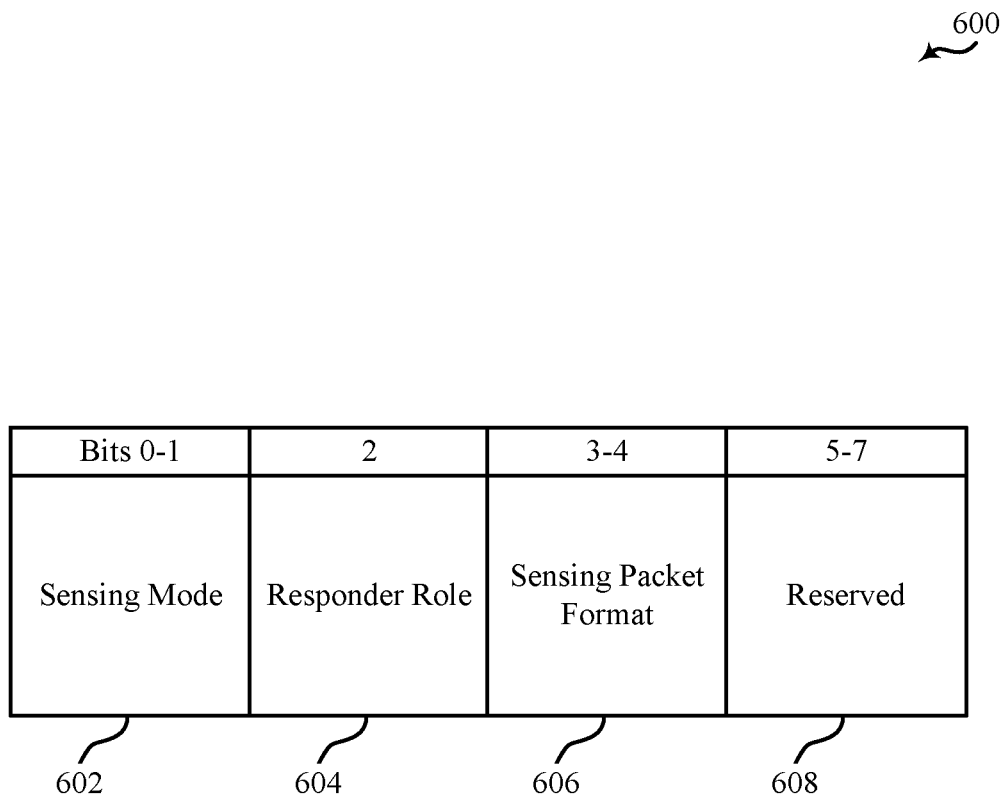
FIGS. 6-9 show example, control diagrams that support RF sensing control for a UWB according to some aspects of the present disclosure.

FIG. 6 shows an example of a control diagram 600 that supports RF sensing control for a UWB system according to some aspects of the present disclosure. The control diagram 600 may represent an example of the common sensing control configuration field 522 described herein with reference to FIG. 5, and may support a set of fields relevant to a sensing instance of a sensing operation in a UWB system. For example, for each sensing instance (sensing round) of a sensing operation, the wireless device 502 and the wireless device 504 may indicate the common sensing control configuration field in a sensing control information element 514 during a sensing control phase 508.

In some aspects, the common sensing control configuration field may include a set of fields configuring one or more parameters of a sensing instance regardless of the simplicity or complexity of a respective sensing operation. The common sensing control configuration field may include a sensing mode field 602 (for example one bit), a responder role field 604 (for example one bit), a sensing packet format field 606 (for example up to two bits), and a reserved field 608 (e.g. up to three bits). The sensing mode field 602 may be a one-bit field indicating whether the sensing operation in a given sensing instance is mono-static, bi-static, or multi-static. A mono-static sensing operation may include one responder (the wireless device 502 or the wireless device 504), a bi-static sensing operation may include two responders (the wireless device 502 and the wireless device 504), and a multi-static sensing operation may include more than two responders (the wireless device 502, the wireless device 504, and additional STAS or an APs).

The responder role field 604 may be a one-bit field indicating whether an responder is a transmitter (indicated via a bit with a value of 0) or a receiver (indicated via a bit with a value of 1). That is, as an initiator (for example controller) may initiate a sensing session and a responder (for example a controlee) may coordinate with the initiator to participate in the sensing session, the responder may be a transmitter (such the wireless device 502) or a receiver (such as the wireless device 504). In this way, the roles of transmitter and receiver are independent of the roles of initiator and responder in a UWB sensing operation, and as such, the responder role field 604 in the common sensing control configuration field may indicate whether an responder corresponds to a transmitter or a receiver. In addition, the common sensing control configuration field may be responder-specific. That is, the wireless device 502 may transmit a common sensing control configuration field in a MAC frame associated with a MAC address of a specific responder such that each responder may receive information regarding its own sensing mode, responder role, and other information.

In some aspects, the wireless devices may use different types of packets for the sensing operation. The sensing packet format field 606 of the common sensing control configuration field may indicate which a physical layer packet format (for example PPDU or other type of packet or waveform) to be used to perform sensing during a particular sensing instance. A type of packet may correspond to a type of physical layer packet format or waveform a transmitter transmits over-the-air during a sensing instance for measurement. The reserved field 608 of the common sensing control configuration field may include one or more reserved bits for future use.

Figure 7:
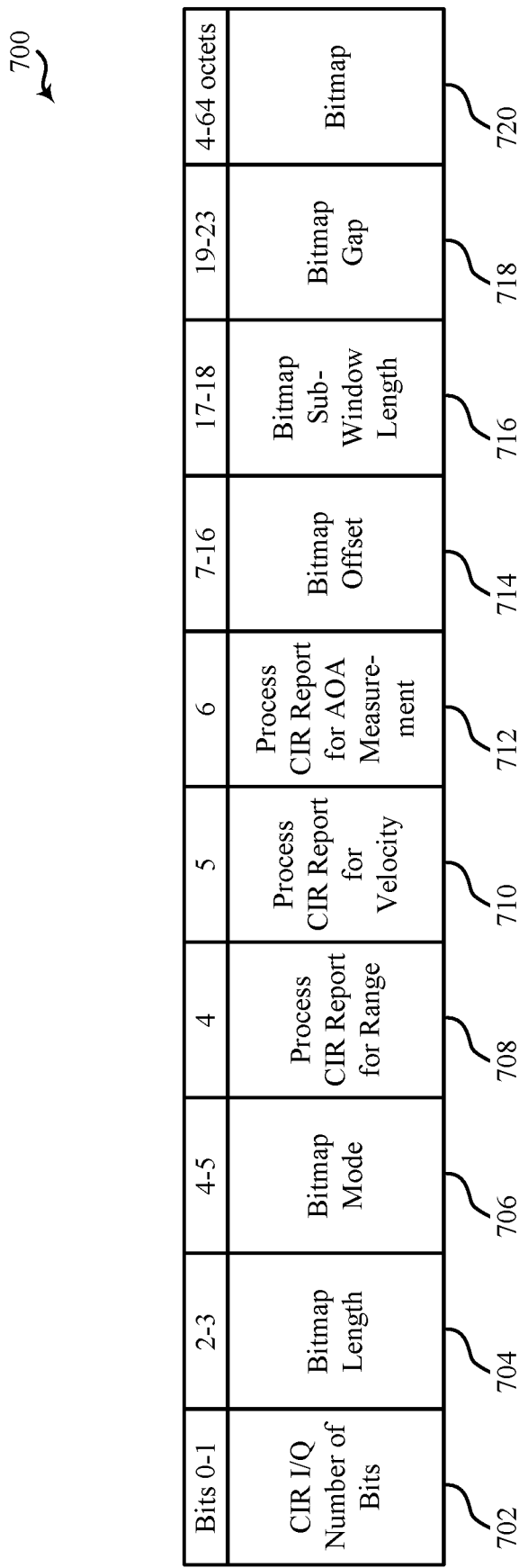

FIG. 7 shows an example of a control diagram 700 that supports RF sensing control for a UWB system according to some aspects of the present disclosure. The control diagram 700 may represent an example of the CIR report parameters configuration field 524 described herein with reference to FIG. 5, and may support a set of fields relevant to a CIR report associated with a sensing instance (a sensing round) of a sensing operation in a UWB system. For example, for each sensing instance of a sensing operation, the wireless device 502 and the wireless device 504 may indicate the CIR report parameters configuration field in a sensing control information element 514 during a sensing control phase 508. The CIR report parameters configuration field may indicate parameters the wireless device 502 or the wireless device 504 may use to transmit a CIR report for a corresponding sensing instance.

The CIR report parameters configuration field may include a set of parameters (a configuration) for generating and transmitting a CIR measurement report corresponding to a sensing instance when requested by an initiator. For example, the CIR report parameters configuration field may include a CIR field 702 that specifies a quantity of bits (CIR in-phase/quadrature (I/Q) number of bits) a wireless device may use to report a CIR measurement. Additionally, or alternatively, the CIR report parameters configuration field may include one or more one-bit fields that indicate whether to process a CIR before being communicated in a CIR report. For example, a field 708, a field 710, and a field 712 may indicate to process the CIR report to generate a range, a velocity, an angle-of-arrival (AOA), respectively, for each object or target. If a bit in any of these fields has a value of 1, a wireless device may process the CIR accordingly (instead of reporting unprocessed CIR measurements).

In some implementations, a wireless device may report a set of CIR measurements over time by representing the CIR in a bitmap. As such, the CIR report parameters configuration field may include a bitmap mode field 706 of up to two bits that indicates a bitmap mode associated with the bitmap. A bitmap mode 0 may indicate that an initiator is to select a bitmap from a predefined subset of bitmaps, a bitmap mode 1 may indicate that the initiator is to select a bitmap from a configuration not specified in the predefined subset of bitmaps, and a bitmap mode 2 may indicate that a responder is to select a bitmap and report the selected bitmap to the initiator. Additional details relating to a bitmap mode 0 indicated in the bitmap mode field 706 are shown by and described with reference to FIG. 8.

In some aspects, the CIR report parameters configuration field may include a bitmap length field 704, a bitmap offset field 714, a bitmap sub-window length field 716, a bitmap gap field 718, a bitmap field 720, or any combination thereof, which may include variable quantities of bits. Each of these bitmap-related fields may be included in the CIR report parameters configuration field based on which bitmap mode is indicated in the bitmap mode field 706. For example, if the bitmap mode field 706 indicates a bitmap mode 0, the initiator may indicate a selected bitmap from the predefined subset of bitmaps using the bitmap length field 704, the bitmap offset field 714, the bitmap sub-window length field 716, the bitmap gap field 718, or a combination thereof (and the bitmap field 720 may be excluded from the CIR report parameters configuration field). That is, the bitmaps in the predefined subset may have known lengths, gaps, and other configured values. Thus, by indicating such values in the fields of the CIR report parameters configuration field, the initiator may define the selected bitmap. Additional details relating to an example of a selected bitmap are shown by and described with reference to FIG. 8.

If the bitmap mode field 706 indicates a bitmap mode 1, the initiator may indicate a bitmap that is excluded from the predefined subset of bitmaps using the bitmap field 720. That is, instead of indicating values associated with a known bitmap via the bitmap length field 704, the bitmap offset field 714, the bitmap sub-window length field 716, the bitmap gap field 718, or a combination thereof, the initiator may explicitly indicate the selected bitmap using a variable quantity of bits in the bitmap field 720 (and the aforementioned fields may be excluded from the CIR report parameters configuration field).

Figure 8:
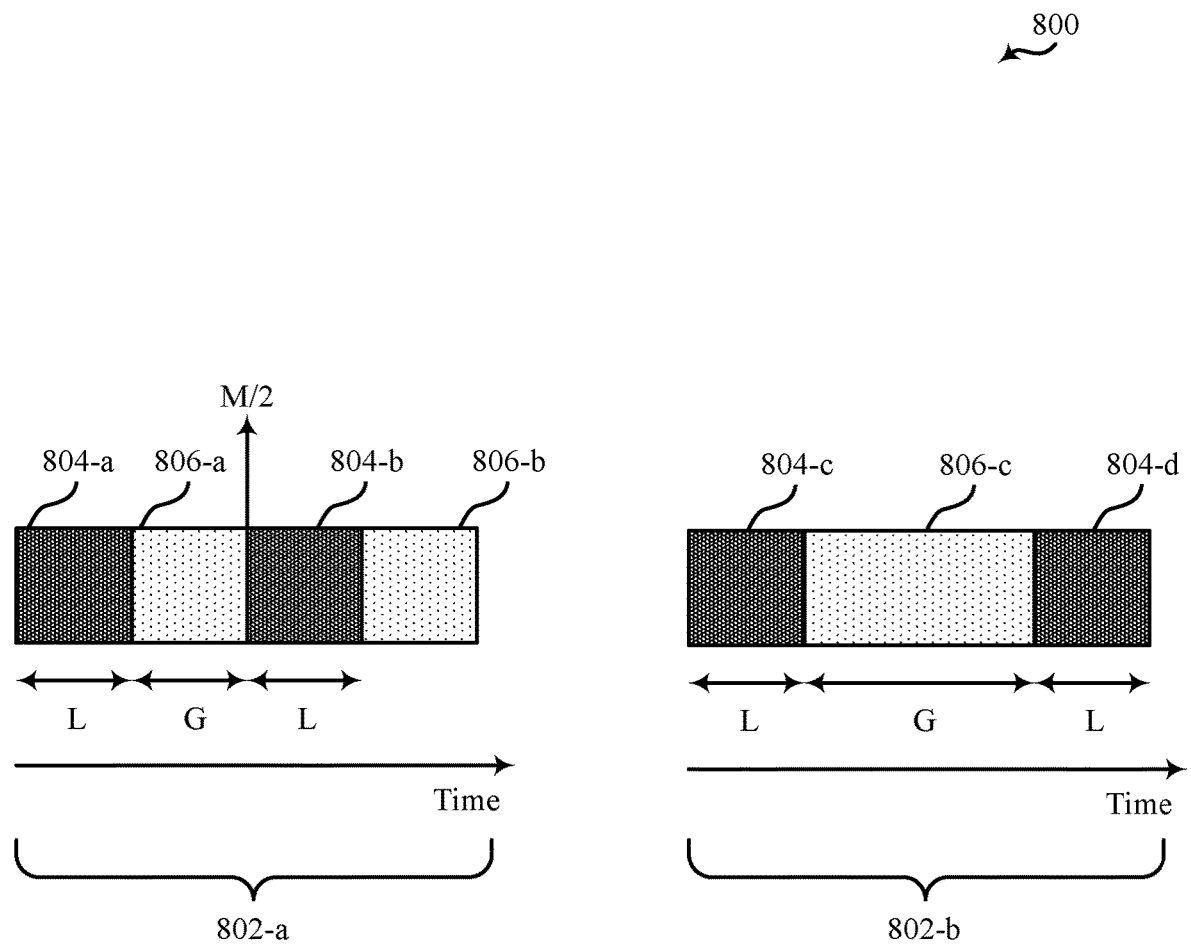

FIG. 8 shows an example of a diagram 800 that supports RF sensing control for a UWB system according to some aspects of the present disclosure. The diagram 800 may show a bitmap configuration 802-*a* and a bitmap configuration 802-*b*, which may represent examples of bitmaps (also referred to herein as CIR bitmaps) selected from a predefined subset of bitmaps for a bitmap mode 0, as described herein with reference to FIG. 7. In some implementations, for each sensing instance (sensing round) of a sensing operation, the wireless device 502 or the wireless device 504 may transmit a CIR report to indicate one or more CIR measurements, where the CIR report may be formatted as a bitmap.

As described herein, the wireless device 502 and the wireless device 504 may participate in a sensing operation over a set of multiple sensing operations to obtain sensing measurements over time. For example, the wireless device 504 may obtain one CIR measurement (also referred to herein as a CIR tap) per sensing instance, and as such, the wireless device 504 may use multiple sensing instances to obtain multiple CIR taps over time. The wireless device 504 may transmit a CIR report to the wireless device 502 if requested, and the CIR report may indicate the CIR taps based on a CIR bitmap. A CIR bitmap may be a sequence of ones and zeros with a duration of a sensing window duration. A one in the CIR bitmap may represent that a corresponding tap is to be reported, and a zero may represent that a corresponding tap is to be excluded from the report. That is, the CIR bitmap may indicate which CIR measurements to include in the CIR report and which CIR measurements may be left out of the CIR report.

To limit a testing burden for a mandatory CIR report bitmap mode (in cases where the initiator specifies the bitmap, bitmap mode 0), the wireless devices may support particular bitmap configurations (such as the bitmap configuration 802-*a* and the bitmap configuration 802-*b*). For example, a CIR bitmap may have a length of M={32, 64, 128, 256} bits (ones and zeros). For each CIR bitmap, there may be two strings of ones with an equal length L={16, 32, ..., M/2}. That is, the strings of length L may represent smaller sensing sub-windows within a larger sensing window of length M. The length M may correspond to a bitmap length field 704 and the length L may correspond to a bitmap sub-window length field 716 as described herein with reference to FIG. 7. That is, the bitmap sub-window length field 716 may indicate a length of smaller sub-windows of interest within the larger window length M. In addition, there may be a gap G between the strings of ones, which may be represented as $$G = \left\{ 0, \frac{M}{2} - 2L + \{8, 16, \ldots, \frac{M}{2}\} \right\}$$

for L=M/2. For example, the bitmap configuration 802-*a* may correspond to a gap G=M/2−L and the bitmap configuration 802-*b* may correspond to a gap G=M−2L. That is, the bitmap gap field 718 may indicate a length of a gap between the smaller sub-windows L. It should be noted that the wireless devices may support other bitmap configurations.

In the example of FIG. 8, the wireless device 504 may generate a CIR report of CIR with a duration of M (for example 32 taps). However, the wireless device 504 may not intend to report all of the taps for the entire duration (some data may not be interesting or of value, the report may be too long for efficient transmission). As such, the bitmap configurations 802-*a* and the CIR bitmaps may enable the wireless device 504 to report CIR for specific parts of the sensing window that are relevant to the wireless device 502.

As described with reference to FIG. 7, the bitmap mode field 706 of the CIR report parameters configuration field may indicate a bitmap mode 0 (the initiator is to select a bitmap from a predefined subset of bitmaps). For the bitmap configuration 802-*a* (corresponding to the bitmap selected by the initiator), the bitmap length field 704 of the CIR report parameters configuration field may indicate the length M, the bitmap sub-window length field 716 may indicate the length L, and the bitmap gap field 718 may indicate the gap G=M/2−L, where any CIR taps measured during the gap may be excluded from the CIR report. That is, the CIR report may include taps during a duration 804-*a* and a duration 804-*b* (interspersed throughout a sensing window) and exclude taps during a gap 806-*a* and a gap 806-*b* (interspersed throughout the sensing window). Similarly, for the bitmap configuration 802-*b*, the bitmap length field 704 may indicate the length M, the bitmap sub-window length field 716 may indicate the length L, and the bitmap gap field 718 may indicate the gap G=M−2L. As such, the CIR report may include taps during a duration 804-*c* and a duration 804-*d* (at the beginning and the end of a sensing window) and exclude taps during a gap 806-*c* (in the middle of the sensing window).

Figure 9:
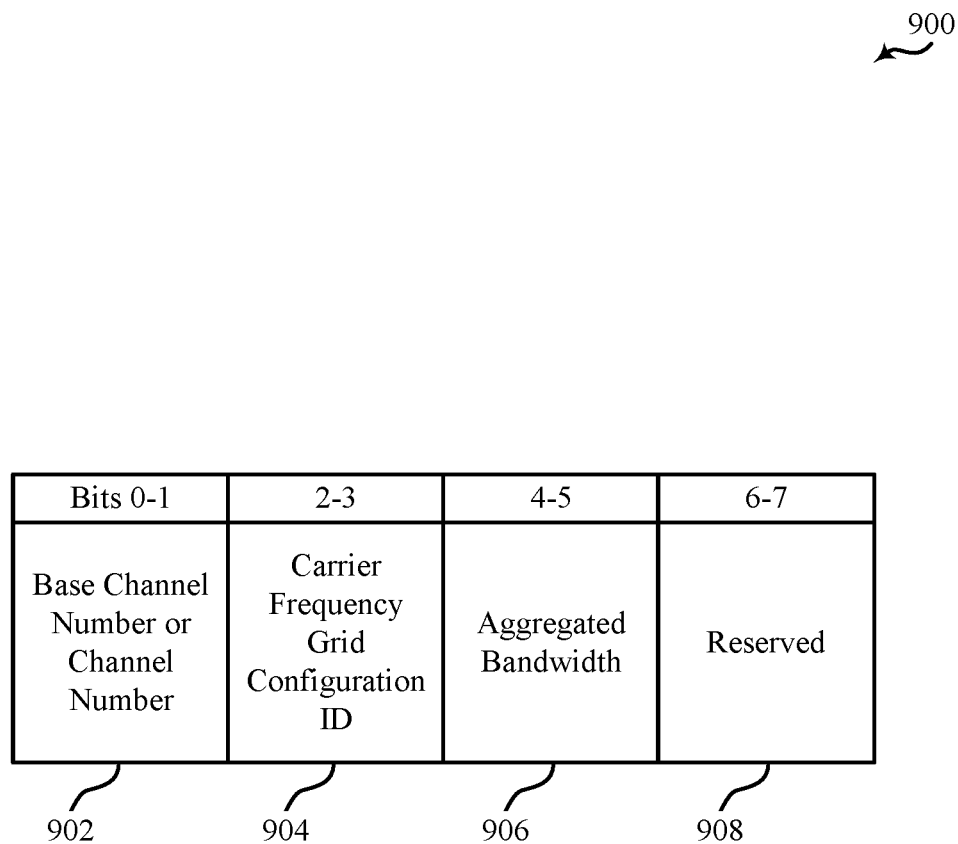

FIG. 9 shows an example of a control diagram 900 that supports RF sensing control for a UWB system according to some aspects of the present disclosure. The control diagram 900 may be an example of the frequency stitching parameters configuration field 526 described herein with reference to FIG. 5, and may support a set of fields relevant to performing frequency stitching for UWB sensing. For each sensing instance (sensing round) of a sensing operation, the wireless device 502 and the wireless device 504 may indicate the frequency stitching parameters present field in a sensing control information element 514 during a sensing control phase 508.

The frequency stitching parameters present field may indicate a set of control parameters for frequency stitching in UWB sensing in fields of variable quantities of bits. Frequency stitching may include combining multiple consecutive channels (approximately four channels up to 2 GHZ) to perform the UWB sensing, and is optional for the UWB sensing (so the frequency stitching parameters present field may be excluded from the sensing control information element 514 for sensing operations without frequency stitching). For example, the frequency stitching parameters present field may include a field 902 that indicates a base channel number or a channel number. Additionally, or alternatively, the frequency stitching parameters present field may indicate a field 904 that indicates a carrier frequency grid configuration ID, a field 906 that indicates an aggregated bandwidth associated with the frequency stitching, and a field 908 that includes one or more reserved bits for future use.

Using frequency stitching, the wireless devices may be allowed an overlap configuration of 25%, 50%, or 75%, which may be enabled by defining a carrier frequency grid identified in the field 904 as 124.8 MHZ. The wireless devices may use a single configuration method for both overlapping and non-overlapping carrier frequency grids. For example, a carrier frequency configuration ID 0 may indicate no overlap, a carrier frequency configuration ID 1 may indicate a 124.8 MHz carrier frequency grid, a carrier frequency configuration ID 2 may indicate a 249.6 MHz carrier frequency grid, and a carrier frequency configuration ID 3 may indicate a 374.4 MHZ carrier frequency grid. In addition, a total bandwidth configuration (corresponding to a quantity of transmissions) may be 500 MHZ, 1 GHZ, 1.5 GHZ, or 2 GHz for the carrier frequency configuration ID 0, 1, 2, and 3, respectively.

Figure 10:
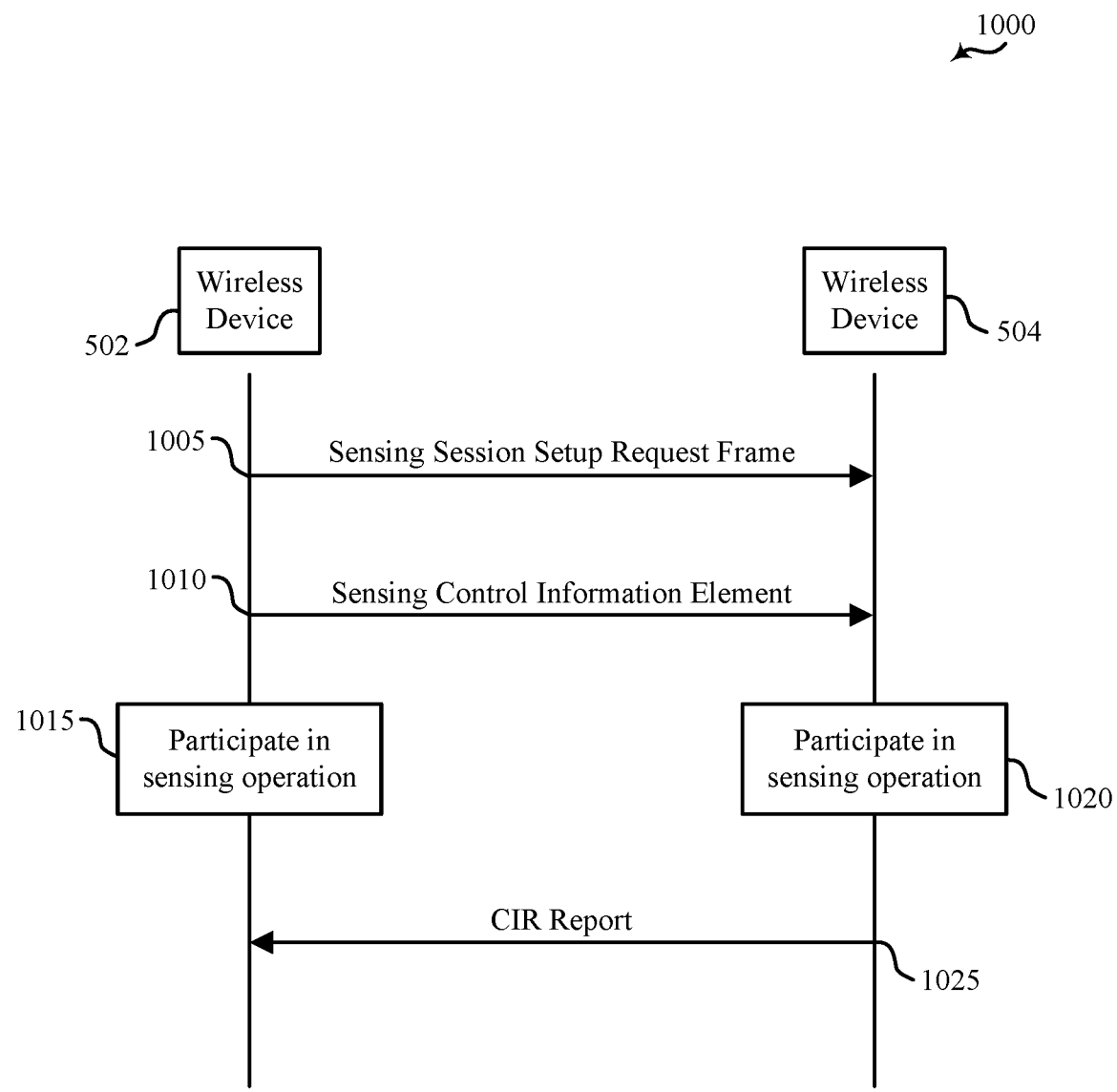
FIG. 10 shows an example of a signal diagram that supports RF sensing control for a UWB system according to some aspects of the present disclosure.

FIG. 10 shows an example of a signal diagram 1000 that supports RF sensing control for a UWB system according to some aspects of the present disclosure. The signal diagram 1000 may implement or be implemented to realize or facilitate aspects of the WLAN 100, or any one or more of the examples 200, 300, 400 and diagrams 500, 600, 700, 800, or 900. For example, the signal diagram 1000 shows communication between a wireless device 502 and a wireless device 504, which may be examples of corresponding devices described herein. The wireless device 502 and the wireless device 504 may be examples of two STAS, two APs, or one STA and one AP. Additionally, the wireless device 502 may be an example of a controller (also referred to herein as an initiator) and the wireless device 504 may be an example of a controlee (also referred to herein as a responder).

In the following description of the signal diagram 1000, the operations may be performed (such as reported or provided) in a different order than the order shown, or the operations performed by the example devices may be performed in different orders or at different times. For example, specific operations also may be left out of the signal diagram 1000, or other operations may be added to the signal diagram 1000. Further, although some operations or signaling may be shown to occur at different times for discussion purposes, these operations may actually occur at the same time.

At 1005, the wireless device 502 (for example a first wireless device, an initiator, a controller) may transmit, to the wireless device 504 (for example a second wireless device, a responder, a controlee), a sensing session setup request frame that indicates a set of parameters for one or more sensing instances (sensing rounds), where the one or more sensing instances are associated with operation of the wireless device 502 with at least the wireless device 504 (at least one responder) in an ultra-wideband system.

At 1010, the wireless device 502 may transmit, to the wireless device 504 and for each of the one or more sensing instances, a sensing control information element that includes at least a common sensing control configuration and a CIR report configuration. The common sensing control configuration may include one or more parameters for configuring a specific sensing instance. For example, the common sensing control configuration may include a indicting whether the sensing operation is mono-static, bi-static, or multi-static, whether wireless device 504 (a responder) is a transmitter or receiver, among other parameters. The CIR report configuration may indicate one more parameters for configuring a CIR report. For example, the CIR report configuration may indicate a CIR bitmap for determining which CIR measurements are to be included or excluded from the CIR report. In addition, the sensing control information element may include one-bit fields that indicate a presence of the common sensing control configuration and the CIR report configuration in the sensing control information element.

At 1015 and 1020, the wireless device 502 and the wireless device 504 may participate in one or more respective sensing operations during the one or more sensing instances. For example, during each sensing instance, the wireless device 502 may transmit a physical layer packet (for example a PPDU). The packet may reflect off and object or target and be received by the wireless device 504, which may measure a CIR.

At 1025, the wireless device 502 may receive, from the wireless device 504, a CIR report in accordance with the CIR report configuration. The CIR report may include a CIR value per sensing instance, for example based on a CIR bitmap. In some implementations, the wireless device 502 may transmit the CIR report as an over-the-air CIR report or a MAC layer management entity report.

Figure 11:
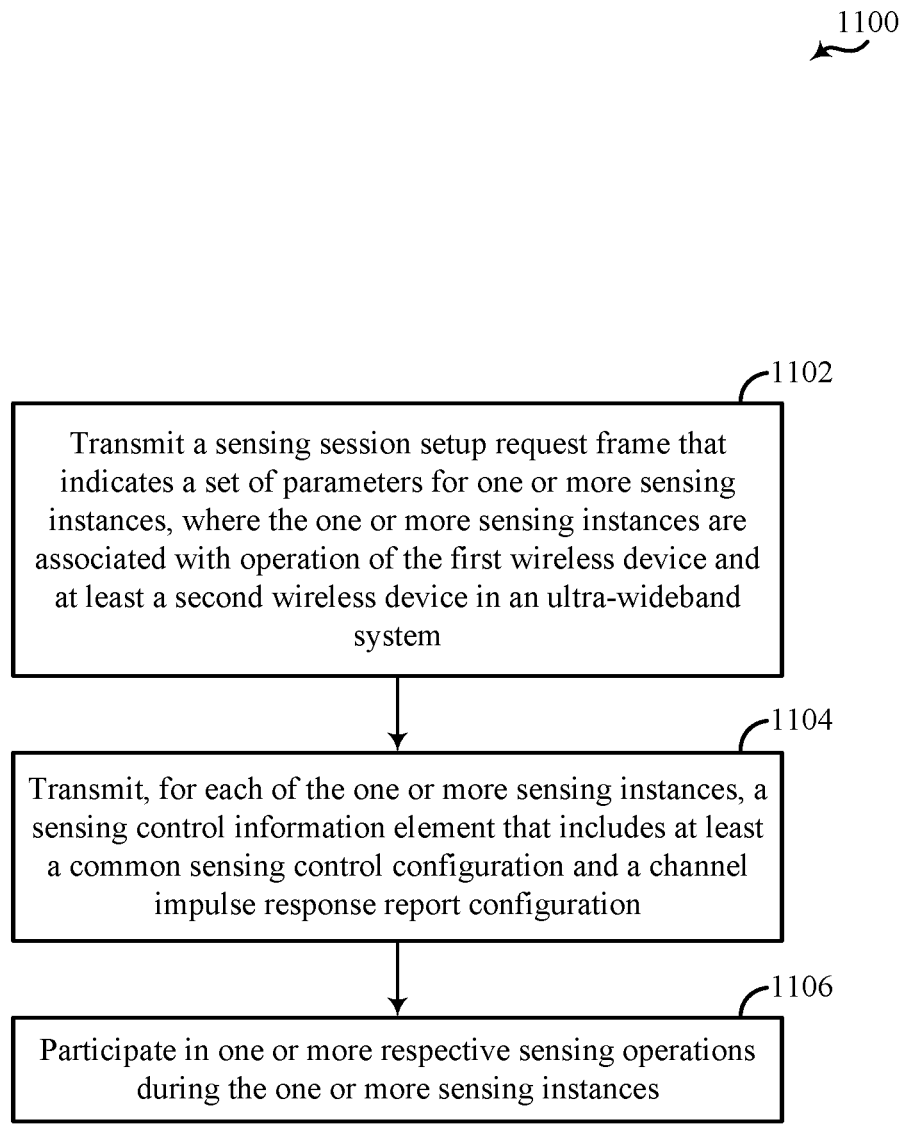
FIGS. 11-14 show flowcharts illustrating example processes that support RF sensing control for a UWB system according to some aspects of the present disclosure.

FIG. 11 shows a flowchart illustrating a method 1100 that supports RF sensing control for a UWB system. The operations of the method 1100 may be implemented by a wireless device or its components as described herein. For example, the operations of the method 1100 may be performed by a wireless device as described with reference to FIGS. 2-11. In some implementations, a wireless device may execute a set of instructions to control the functional elements of the wireless device to perform the described functions. Additionally, or alternatively, the wireless device may perform aspects of the described functions using special-purpose hardware.

At 1102, the method may include transmitting a sensing session setup request frame that indicates a set of parameters for one or more sensing instances (sensing rounds), where the one or more sensing instances are associated with operation of the first wireless device and at least a second wireless device in a UWB system. The operations of 1102 may be performed in accordance with examples as disclosed herein. In some implementations, aspects of the operations of 1102 may be performed by a sensing request component 1502 as described with reference to FIG. 11.

At 1104, the method may include transmitting, for each of the one or more sensing instances, a sensing control information element that includes at least a common sensing control configuration and a CIR report configuration. The operations of 1104 may be performed in accordance with examples as disclosed herein. In some implementations, aspects of the operations of 1104 may be performed by a sensing control component 1504 as described with reference to FIG. 11.

At 1106, the method may include participating in one or more respective sensing operations during the one or more sensing instances. The operations of 1106 may be performed in accordance with examples as disclosed herein. In some implementations, aspects of the operations of 1106 may be performed by a sensing operation component 1506 as described with reference to FIG. 11.

Figure 12:
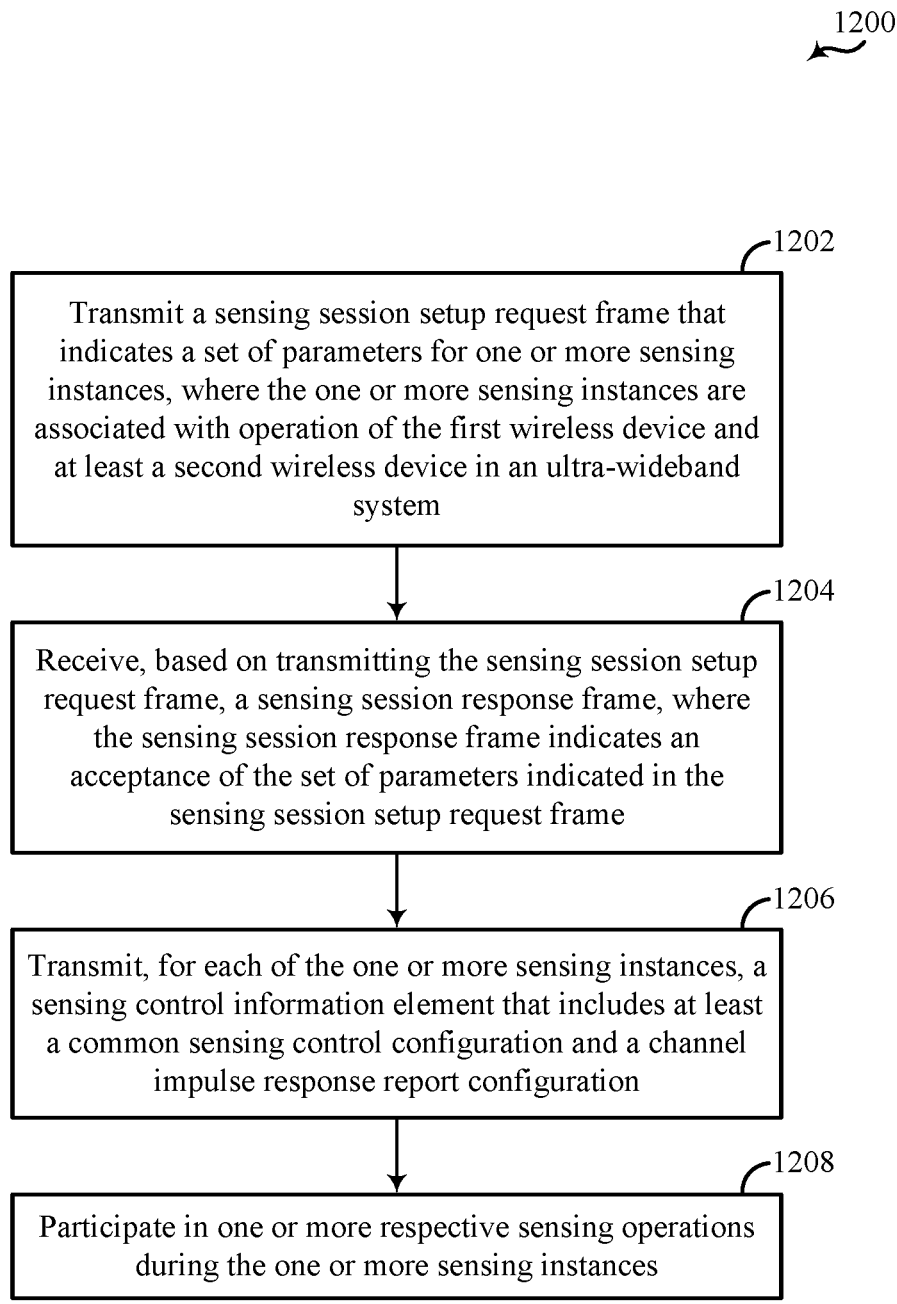

FIG. 12 shows a flowchart illustrating a method 1200 that supports RF sensing control for a UWB system. The operations of the method 1200 may be implemented by a wireless device or its components as described herein. For example, the operations of the method 1200 may be performed by a wireless device as described with reference to FIGS. 2-11. In some implementations, a wireless device may execute a set of instructions to control the functional elements of the wireless device to perform the described functions. Additionally, or alternatively, the wireless device may perform aspects of the described functions using special-purpose hardware.

At 1202, the method may include transmitting a sensing session setup request frame that indicates a set of parameters for one or more sensing instances (sensing round), where the one or more sensing instances are associated with operation of the first wireless device and at least a second wireless device in a UWB system. The operations of 1202 may be performed in accordance with examples as disclosed herein. In some implementations, aspects of the operations of 1202 may be performed by a sensing request component 1502 as described with reference to FIG. 11.

At 1204, the method may include receiving, based on transmitting the sensing session setup request frame, a sensing session response frame, where the sensing session response frame indicates an acceptance of the set of parameters indicated in the sensing session setup request frame. The operations of 1204 may be performed in accordance with examples as disclosed herein. In some implementations, aspects of the operations of 1204 may be performed by a response component 1514 as described with reference to FIG. 11.

At 1206, the method may include transmitting, for each of the one or more sensing instances, a sensing control information element that includes at least a common sensing control configuration and a CIR report configuration. The operations of 1206 may be performed in accordance with examples as disclosed herein. In some implementations, aspects of the operations of 1206 may be performed by a sensing control component 1504 as described with reference to FIG. 11.

At 1208, the method may include participating in one or more respective sensing operations during the one or more sensing instances. The operations of 1208 may be performed in accordance with examples as disclosed herein. In some implementations, aspects of the operations of 1208 may be performed by a sensing operation component 1506 as described with reference to FIG. 11.

Figure 13:
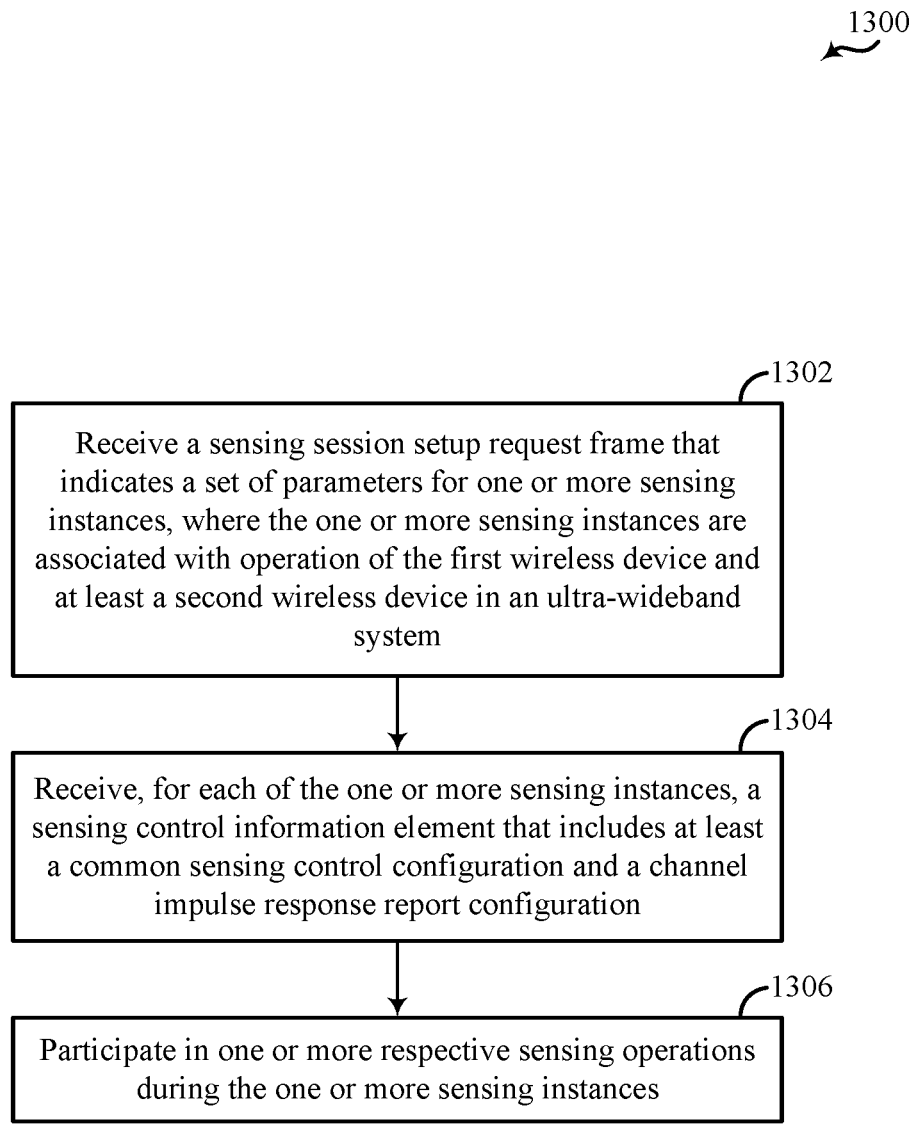

FIG. 13 shows a flowchart illustrating a method 1300 that supports RF sensing control for a UWB system. The operations of the method 1300 may be implemented by a wireless device or its components as described herein. For example, the operations of the method 1300 may be performed by a wireless device as described with reference to FIGS. 2-11. In some implementations, a wireless device may execute a set of instructions to control the functional elements of the wireless device to perform the described functions. Additionally, or alternatively, the wireless device may perform aspects of the described functions using special-purpose hardware.

At 1302, the method may include receiving a sensing session setup request frame that indicates a set of parameters for one or more sensing instances, where the one or more sensing instances are associated with operation of the first wireless device and at least a second wireless device in a UWB system. The operations of 1302 may be performed in accordance with examples as disclosed herein. In some implementations, aspects of the operations of 1302 may be performed by a sensing request component 1502 as described with reference to FIG. 11.

At 1304, the method may include receiving, for each of the one or more sensing instances, a sensing control information element that includes at least a common sensing control configuration and a CIR report configuration. The operations of 1304, may be performed in accordance with examples as disclosed herein. In some implementations, aspects of the operations of 1304, may be performed by a sensing control component 1504 as described with reference to FIG. 11.

At 1306, the method may include participating in one or more respective sensing operations during the one or more sensing instances. The operations of 1306 may be performed in accordance with examples as disclosed herein. In some implementations, aspects of the operations of 1306 may be performed by a sensing operation component 1506 as described with reference to FIG. 11.

Figure 14:
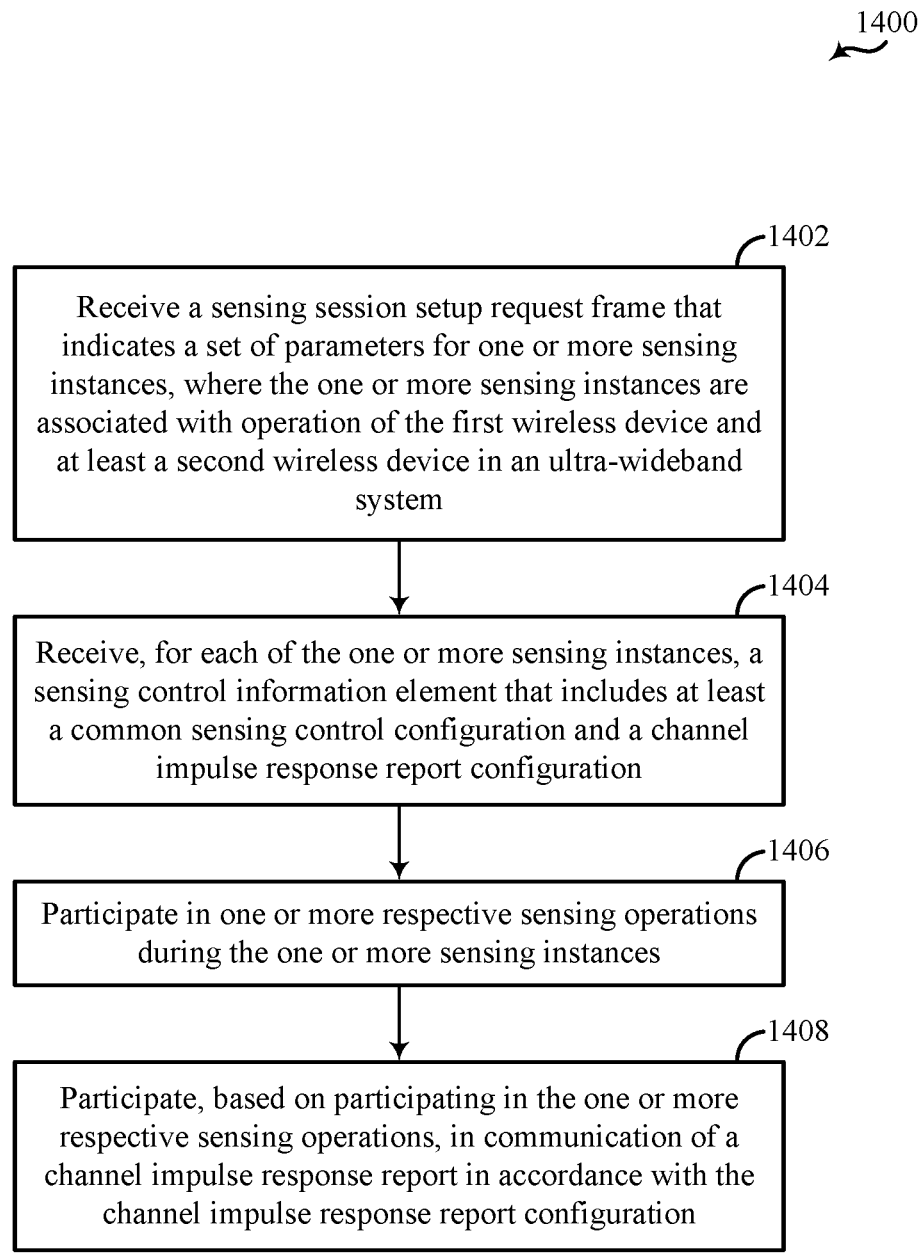

FIG. 14 shows a flowchart illustrating a method 1400 that supports RF sensing control for a UWB system. The operations of the method 1400 may be implemented by a wireless device or its components as described herein. For example, the operations of the method 1400 may be performed by a wireless device as described with reference to FIGS. 2-11. In some implementations, a wireless device may execute a set of instructions to control the functional elements of the wireless device to perform the described functions. Additionally, or alternatively, the wireless device may perform aspects of the described functions using special-purpose hardware.

At 1402, the method may include receiving a sensing session setup request frame that indicates a set of parameters for one or more sensing instances, where the one or more sensing instances are associated with operation of the first wireless device and at least a second wireless device in a UWB system. The operations of 1402 may be performed in accordance with examples as disclosed herein. In some implementations, aspects of the operations of 1402 may be performed by a sensing request component 1502 as described with reference to FIG. 11.

At 1404, the method may include receiving, for each of the one or more sensing instances, a sensing control information element that includes at least a common sensing control configuration and a CIR report configuration. The operations of 1404 may be performed in accordance with examples as disclosed herein. In some implementations, aspects of the operations of 1404 may be performed by a sensing control component 1504 as described with reference to FIG. 11.

At 1406, the method may include participating in one or more respective sensing operations during the one or more sensing instances. The operations of 1406 may be performed in accordance with examples as disclosed herein. In some implementations, aspects of the operations of 1406 may be performed by a sensing operation component 1506 as described with reference to FIG. 11.

At 1408, the method may include participating, based on participating in the one or more respective sensing operations, in communication of a CIR report in accordance with the CIR report configuration. The operations of 1408 may be performed in accordance with examples as disclosed herein. In some implementations, aspects of the operations of 1408 may be performed by a CIR report component 1512 as described with reference to FIG. 11.

Figure 15:
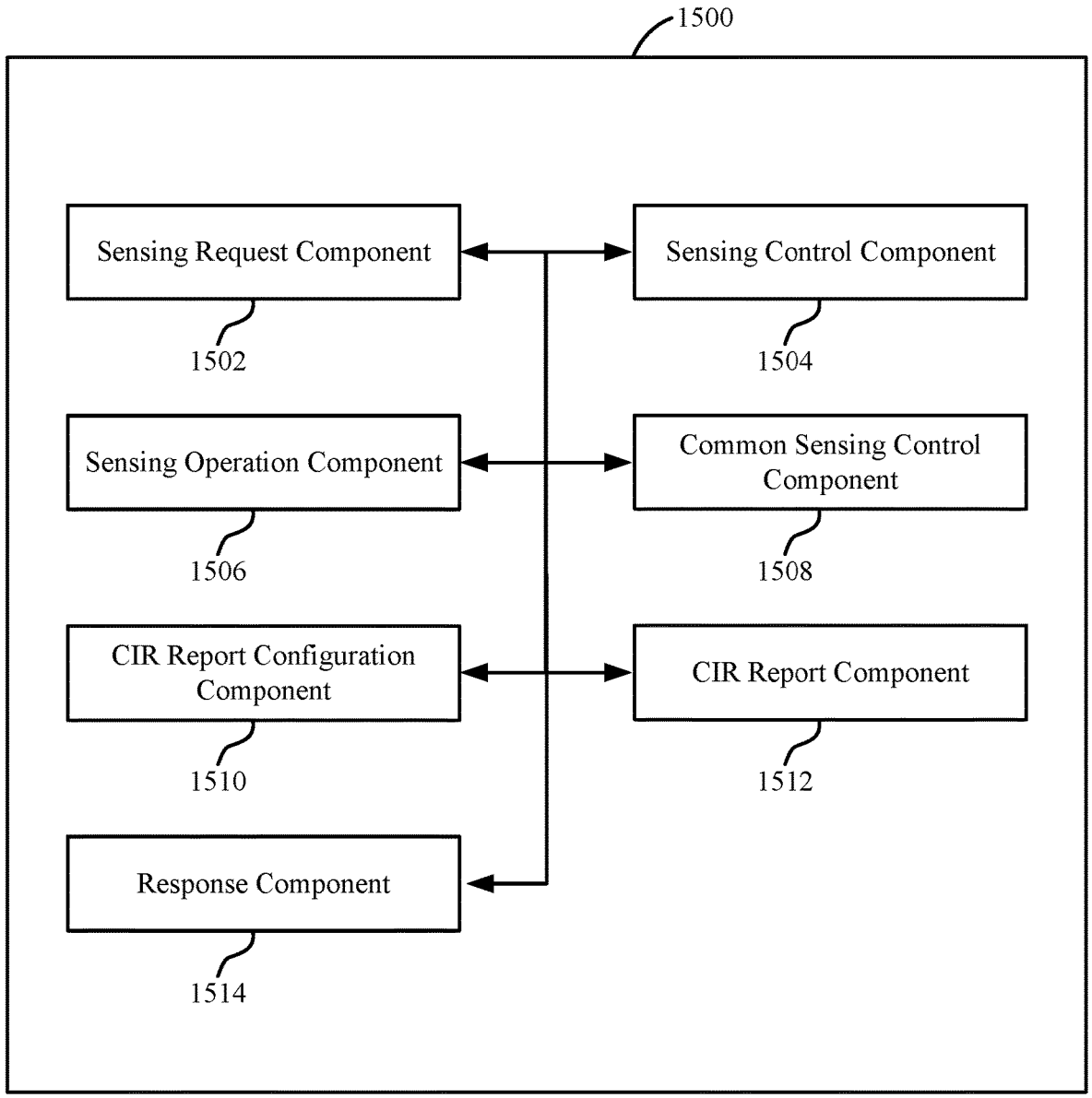
FIG. 15 shows a block diagram of an example wireless communication device that supports RF sensing control for a UWB system according to some aspects of the present disclosure.

FIG. 15 shows a block diagram of a wireless device 1500 that supports RF sensing control for a UWB system. The wireless device 1500 may be an example of aspects of a wireless device as described with reference to FIGS. 2-10. The wireless device 1500, or various components thereof, may be an example of means for performing various aspects of RF sensing control for a UWB system as described herein. For example, the wireless device 1500 may include a sensing request component 1502, a sensing control component 1504, a sensing operation component 1506, a common sensing control component 1508, a CIR report configuration component 1510, a CIR report component 1512, a response component 1514, or any combination thereof. Each of these components may communicate, directly or indirectly, with one another (for example via one or more buses).

The wireless device 1500 may support wireless communication at a first wireless device in accordance with examples as disclosed herein. The sensing request component 1502 is capable of, configured to, or operable to support a means for transmitting a sensing session setup request frame that indicates a set of parameters for one or more sensing instances, where the one or more sensing instances are associated with operation of the first wireless device and at least a second wireless device in a UWB system. The sensing control component 1504 is capable of, configured to, or operable to support a means for transmitting, for each of the one or more sensing instances, a sensing control information element that includes at least a common sensing control configuration and a CIR report configuration. The sensing operation component 1506 is capable of, configured to, or operable to support a means for participating in one or more respective sensing operations during the one or more sensing instances.

In some implementations, the sensing control information element includes a common sensing control present field that indicates a presence of the common sensing control configuration in the sensing control information element and a CIR report parameters present field that indicates a presence of the CIR report configuration in the sensing control information element.

In some implementations, the common sensing control configuration includes at least a sensing mode field, a responder role field, a sensing packet format field, a set of reserved bits, or any combination thereof.

In some implementations, the sensing mode field indicates that the one or more sensing instances are associated with a mono-static sensing operation, a bi-static sensing operation, or a multi-static sensing operation.

In some implementations, the responder role field indicates whether a responder in the one or more respective sensing operations is a transmitter wireless device or a receiver wireless device.

In some implementations, the sensing packet format field indicates a physical layer packet format to be used for the one or more respective sensing operations.

In some implementations, the CIR report configuration includes a bitmap mode field that indicates a bitmap mode associated with a bitmap of a CIR report.

In some implementations, the bitmap mode is a first bitmap mode indicating that the first wireless device is to select a bitmap from a predefined set of bitmaps for the CIR report, a second bitmap mode indicating that the first wireless device is to define a bitmap for the CIR report, or a third bitmap mode indicating that the second wireless device is to indicate a bitmap for the CIR report, where the first wireless device is an initiator of the one or more respective sensing operations and the second wireless device is a responder to the one or more respective sensing operations.

In some implementations, the bitmap mode is the first bitmap mode, and where the CIR report configuration includes at least a bitmap offset field, a bitmap window length field, a bitmap sub-window length field, a bitmap gap field, or a combination thereof that indicate the bitmap selected for the CIR report.

In some implementations, the bitmap mode is the second bitmap mode, and where the CIR report configuration includes at least a bitmap field that explicitly indicates the bitmap defined for the CIR report.

In some implementations, the CIR report configuration includes one or more CIR report processing fields that indicate to process a CIR report to generate at least a range, a velocity, an angle of arrival (AOA), or a combination thereof associated with an object.

In some implementations, the CIR report component 1512 is capable of, configured to, or operable to support a means for participating, based on participating in the one or more respective sensing operations, in communication of a CIR report in accordance with the CIR report configuration.

In some implementations, the CIR report is a MAC layer management entity report.

In some implementations, the CIR report is an over-the-air entity report.

In some implementations, the response component 1514 is capable of, configured to, or operable to support a means for receiving, based on transmitting the sensing session setup request frame, a sensing session response frame, where the sensing session response frame indicates an acceptance of the set of parameters indicated in the sensing session setup request frame.

In some implementations, the response component 1514 is capable of, configured to, or operable to support a means for receiving, based on transmitting the sensing session setup request frame, a sensing session response frame, where the sensing session response frame indicates a rejection of the set of parameters indicated in the sensing session setup request frame and indicates a second set of parameters for the one or more sensing instances.

In some implementations, a sensing instance includes a sensing control phase, a sensing phase, and a sensing measurement report phase.

In some implementations, to support transmitting the sensing control information element, the sensing control component 1504 is capable of, configured to, or operable to support a means for transmitting, for each of the one or more sensing instances and for each second wireless device associated with the one or more sensing instances, a MAC frame indicating the sensing control information element, where the MAC frame is associated with a MAC address of the respective second wireless device.

Additionally, or alternatively, the wireless device 1500 may support wireless communication at a first wireless device in accordance with examples as disclosed herein. In some implementations, the sensing request component 1502 is capable of, configured to, or operable to support a means for receiving a sensing session setup request frame that indicates a set of parameters for one or more sensing instances, where the one or more sensing instances are associated with operation of the first wireless device and at least a second wireless device in a UWB system. In some implementations, the sensing control component 1504 is capable of, configured to, or operable to support a means for receiving, for each of the one or more sensing instances, a sensing control information element that includes at least a common sensing control configuration and a CIR report configuration. In some implementations, the sensing operation component 1506 is capable of, configured to, or operable to support a means for participating in one or more respective sensing operations during the one or more sensing instances.

In some implementations, the sensing control information element includes a common sensing control present field that indicates a presence of the common sensing control configuration in the sensing control information element and a CIR report parameters present field that indicates a presence of the CIR report configuration in the sensing control information element.

In some implementations, the common sensing control configuration includes at least a sensing mode field, a responder role field, a sensing packet format field, a set of reserved bits, or any combination thereof.

In some implementations, the sensing mode field indicates that the one or more sensing instances are associated with a mono-static sensing operation, a bi-static sensing operation, or a multi-static sensing operation.

In some implementations, the responder role field indicates whether a responder in the one or more respective sensing operations is a transmitter wireless device or a receiver wireless device.

In some implementations, the sensing packet format field indicates a physical layer packet format to be used for the one or more respective sensing operations.

In some implementations, the CIR report configuration includes a bitmap mode field that indicates a bitmap mode associated with a bitmap of a CIR report.

In some implementations, the bitmap mode is a first bitmap mode indicating that the first wireless device is to select a bitmap from a predefined set of bitmaps for the CIR report, a second bitmap mode indicating that the first wireless device is to define a bitmap for the CIR report, or a third bitmap mode indicating that a second wireless device is to indicate a bitmap for the CIR report, where the first wireless device is an initiator of the one or more respective sensing operations and the second wireless device is a responder to the one or more respective sensing operations.

In some implementations, the bitmap mode is the first bitmap mode, and where the CIR report configuration includes at least a bitmap offset field, a bitmap window length field, a bitmap sub-window length field, a bitmap gap field, or a combination thereof that indicate the bitmap selected for the CIR report.

In some implementations, the bitmap mode is the second bitmap mode, and where the CIR report configuration includes at least a bitmap field that explicitly indicates the bitmap defined for the CIR report.

In some implementations, the CIR report configuration includes one or more CIR report processing fields that indicate to process a CIR report to generate at least a range, a velocity, an angle of arrival (AOA), or a combination thereof associated with an object.

In some implementations, the CIR report component 1512 is capable of, configured to, or operable to support a means for participating, based on participating in the one or more respective sensing operations, in communication of a CIR report in accordance with the CIR report configuration.

In some implementations, the CIR report is a MAC layer management entity report.

In some implementations, the CIR report is an over-the-air entity report.

In some implementations, the response component 1514 is capable of, configured to, or operable to support a means for transmitting, based on receiving the sensing session setup request frame, a sensing session response frame, where the sensing session response frame indicates an acceptance of the set of parameters indicated in the sensing session setup request frame.

In some implementations, the response component 1514 is capable of, configured to, or operable to support a means for transmitting, based on receiving the sensing session setup request frame, a sensing session response frame, where the sensing session response frame indicates a rejection of the set of parameters indicated in the sensing session setup request frame and indicates a second set of parameters for the one or more sensing instances.

In some implementations, a sensing instance includes a sensing control phase, a sensing phase, and a sensing measurement report phase.

In some implementations, to support receiving the sensing control information element, the sensing control component 1504 is capable of, configured to, or operable to support a means for receiving, for each of the one or more sensing instances, a MAC frame indicating the sensing control information element, where the MAC frame is associated with a MAC address of the second wireless device.

Implementation examples are described in the following numbered clauses:

Clause 1: A method for wireless communication at a first wireless device, comprising: transmitting a sensing session setup request frame that indicates a set of parameters for one or more sensing instances, wherein the one or more sensing instances are associated with operation of the first wireless device and at least a second wireless device in a UWB system; transmitting, for each of the one or more sensing instances, a sensing control information element that includes at least a common sensing control configuration and a CIR report configuration; and participating in one or more respective sensing operations during the one or more sensing instances.

Clause 2: The method of clause 1, wherein the sensing control information element includes a common sensing control present field that indicates a presence of the common sensing control configuration in the sensing control information element and a CIR report parameters present field that indicates a presence of the CIR report configuration in the sensing control information element.

Clause 3: The method of any of clauses 1 through 2, wherein the common sensing control configuration includes at least a sensing mode field, a responder role field, a sensing packet format field, a set of reserved bits, or any combination thereof.

Clause 4: The method of clause 3, wherein the sensing mode field indicates that the one or more sensing instances are associated with a mono-static sensing operation, a bi-static sensing operation, or a multi-static sensing operation.

Clause 5: The method of any of clauses 3 through 4, wherein the responder role field indicates whether a responder in the one or more respective sensing operations is a transmitter wireless device or a receiver wireless device.

Clause 6: The method of any of clauses 3 through 5, wherein the sensing packet format field indicates a physical layer packet format to be used for the one or more respective sensing operations.

Clause 7: The method of any of clauses 1 through 6, wherein the CIR report configuration includes a bitmap mode field that indicates a bitmap mode associated with a bitmap of a CIR report.

Clause 8: The method of clause 7, wherein the bitmap mode is a first bitmap mode indicating that the first wireless device is to select a bitmap from a predefined set of bitmaps for the CIR report, a second bitmap mode indicating that the first wireless device is to define a bitmap for the CIR report, or a third bitmap mode indicating that the second wireless device is to indicate a bitmap for the CIR report, wherein the first wireless device is an initiator of the one or more respective sensing operations and the second wireless device is a responder to the one or more respective sensing operations.

Clause 9: The method of clause 8, wherein the bitmap mode is the first bitmap mode, and wherein the CIR report configuration includes at least a bitmap offset field, a bitmap window length field, a bitmap sub-window length field, a bitmap gap field, or a combination thereof that indicate the bitmap selected for the CIR report.

Clause 10: The method of any of clauses 8 through 9, wherein the bitmap mode is the second bitmap mode, and wherein the CIR report configuration includes at least a bitmap field that explicitly indicates the bitmap defined for the CIR report.

Clause 11: The method of any of clauses 1 through 10, wherein the CIR report configuration includes one or more CIR report processing fields that indicate to process a CIR report to generate at least a range, a velocity, an angle of arrival (AOA), or a combination thereof associated with an object.

Clause 12: The method of any of clauses 1 through 11, further comprising: participating, based at least in part on participating in the one or more respective sensing operations, in communication of a CIR report in accordance with the CIR report configuration.

Clause 13: The method of clause 12, wherein the CIR report is a MAC layer management entity report.

Clause 14: The method of any of clauses 12 through 13, wherein the CIR report is an over-the-air entity report.

Clause 15: The method of any of clauses 1 through 14, further comprising: receiving, based at least in part on transmitting the sensing session setup request frame, a sensing session response frame, wherein the sensing session response frame indicates an acceptance of the set of parameters indicated in the sensing session setup request frame.

Clause 16: The method of any of clauses 1 through 15, further comprising: receiving, based at least in part on transmitting the sensing session setup request frame, a sensing session response frame, wherein the sensing session response frame indicates a rejection of the set of parameters indicated in the sensing session setup request frame and indicates a second set of parameters for the one or more sensing instances.

Clause 17: The method of any of clauses 1 through 16, wherein a sensing instance comprises a sensing control phase, a sensing phase, and a sensing measurement report phase.

Clause 18: The method of any of clauses 1 through 17, wherein transmitting the sensing control information element comprises: transmitting, for each of the one or more sensing instances and for each second wireless device associated with the one or more sensing instances, a MAC frame indicating the sensing control information element, wherein the MAC frame is associated with a MAC address of the respective second wireless device.

Clause 19: A method for wireless communication at a first wireless device, comprising: receiving a sensing session setup request frame that indicates a set of parameters for one or more sensing instances, wherein the one or more sensing instances are associated with operation of the first wireless device and at least a second wireless device in a UWB system; receiving, for each of the one or more sensing instances, a sensing control information element that includes at least a common sensing control configuration and a CIR report configuration; and participating in one or more respective sensing operations during the one or more sensing instances.

Clause 20: The method of clause 19, wherein the sensing control information element includes a common sensing control present field that indicates a presence of the common sensing control configuration in the sensing control information element and a CIR report parameters present field that indicates a presence of the CIR report configuration in the sensing control information element.

Clause 21: The method of any of clauses 19 through 20, wherein the common sensing control configuration includes at least a sensing mode field, a responder role field, a sensing packet format field, a set of reserved bits, or any combination thereof.

Clause 22: The method of clause 21, wherein the sensing mode field indicates that the one or more sensing instances are associated with a mono-static sensing operation, a bi-static sensing operation, or a multi-static sensing operation.

Clause 23: The method of any of clauses 21 through 22, wherein the responder role field indicates whether a responder in the one or more respective sensing operations is a transmitter wireless device or a receiver wireless device.

Clause 24: The method of any of clauses 21 through 23, wherein the sensing packet format field indicates a physical layer packet format to be used for the one or more respective sensing operations.

Clause 25: The method of any of clauses 19 through 24, wherein the CIR report configuration includes a bitmap mode field that indicates a bitmap mode associated with a bitmap of a CIR report.

Clause 26: The method of clause 25, wherein the bitmap mode is a first bitmap mode indicating that the first wireless device is to select a bitmap from a predefined set of bitmaps for the CIR report, a second bitmap mode indicating that the first wireless device is to define a bitmap for the CIR report, or a third bitmap mode indicating that a second wireless device is to indicate a bitmap for the CIR report, wherein the first wireless device is an initiator of the one or more respective sensing operations and the second wireless device is a responder to the one or more respective sensing operations.

Clause 27: The method of clause 26, wherein the bitmap mode is the first bitmap mode, and wherein the CIR report configuration includes at least a bitmap offset field, a bitmap window length field, a bitmap sub-window length field, a bitmap gap field, or a combination thereof that indicate the bitmap selected for the CIR report.

Clause 28: The method of any of clauses 26 through 27, wherein the bitmap mode is the second bitmap mode, and wherein the CIR report configuration includes at least a bitmap field that explicitly indicates the bitmap defined for the CIR report.

Clause 29: The method of any of clauses 19 through 28, wherein the CIR report configuration includes one or more CIR report processing fields that indicate to process a CIR report to generate at least a range, a velocity, an angle of arrival (AOA), or a combination thereof associated with an object.

Clause 30: The method of any of clauses 19 through 29, further comprising: participating, based at least in part on participating in the one or more respective sensing operations, in communication of a CIR report in accordance with the CIR report configuration.

Clause 31: The method of clause 30, wherein the CIR report is a MAC layer management entity report.

Clause 32: The method of any of clauses 30 through 31, wherein the CIR report is an over-the-air entity report.

Clause 33: The method of any of clauses 19 through 32, further comprising: transmitting, based at least in part on receiving the sensing session setup request frame, a sensing session response frame, wherein the sensing session response frame indicates an acceptance of the set of parameters indicated in the sensing session setup request frame.

Clause 34: The method of any of clauses 19 through 33, further comprising: transmitting, based at least in part on receiving the sensing session setup request frame, a sensing session response frame, wherein the sensing session response frame indicates a rejection of the set of parameters indicated in the sensing session setup request frame and indicates a second set of parameters for the one or more sensing instances.

Clause 35: The method of any of clauses 19 through 34, wherein a sensing instance comprises a sensing control phase, a sensing phase, and a sensing measurement report phase.

Clause 36: The method of any of clauses 19 through 35, wherein receiving the sensing control information element comprises: receiving, for each of the one or more sensing instances, a MAC frame indicating the sensing control information element, wherein the MAC frame is associated with a MAC address of the second wireless device.

Clause 37: An apparatus for wireless communication at a first wireless device, comprising at least one memory; and at least one processor communicatively coupled with the at least one memory, the at least one processor operable to cause the first wireless device to perform a method of any of clauses 1 through 18.

Clause 38: An apparatus for wireless communication at a first wireless device, comprising at least one means for performing a method of any of clauses 1 through 18.

Clause 39: A non-transitory computer-readable medium storing code for wireless communication at a first wireless device, the code comprising instructions executable by a processor to perform a method of any of clauses 1 through 18.

Clause 40: An apparatus for wireless communication at a first wireless device, comprising at least one memory; and at least one processor communicatively coupled with the at least one memory, the at least one processor operable to cause the first wireless device to perform a method of any of clauses 19 through 36.

Clause 41: An apparatus for wireless communication at a first wireless device, comprising at least one means for performing a method of any of clauses 19 through 36.

Clause 42: A non-transitory computer-readable medium storing code for wireless communication at a first wireless device, the code comprising instructions executable by a processor to perform a method of any of clauses 19 through 36.

As used herein, the term "determine" or "determining" encompasses a wide variety of actions and, therefore, "determining" can include calculating, computing, processing, deriving, investigating, looking up (such as via looking up in a table, a database or another data structure), inferring, ascertaining, measuring, and the like. Also, "determining" can include receiving (such as receiving information), accessing (such as accessing data stored in memory), transmitting (such as transmitting information) and the like. Also, "determining" can include resolving, selecting, obtaining, choosing, establishing and other such similar actions.

As used herein, a phrase referring to "at least one of" a list of items refers to any combination of those items, including single members. As an example, "at least one of: a, b, or c" is intended to cover: a, b, c, a-b, a-c, b-c, and a-b-c. As used herein, "or" is intended to be interpreted in the inclusive sense, unless otherwise explicitly indicated. For example, "a or b" may include a only, b only, or a combination of a and b.

As used herein, "based on" is intended to be interpreted in the inclusive sense, unless otherwise explicitly indicated. For example, "based on" may be used interchangeably with "based at least in part on," "associated with", or "in accordance with" unless otherwise explicitly indicated. Specifically, unless a phrase refers to "based on only 'a,'" or the equivalent in context, whatever it is that is "based on 'a,'" or "based at least in part on 'a,'" may be based on "a" alone or based on a combination of "a" and one or more other factors, conditions or information.

The various illustrative components, logic, logical blocks, modules, circuits, operations and algorithm processes described in connection with the examples disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the examples described in this disclosure may be readily apparent to persons having ordinary skill in the art, and the generic principles defined herein may be applied to other examples without departing from the spirit or scope of this disclosure. Thus, the claims are not intended to be limited to the examples shown herein, but are to be accorded the widest scope consistent with this disclosure, the principles and the features disclosed herein.

Additionally, various features that are described in this specification in the context of separate examples also can be implemented in combination in a single implementation. Conversely, various features that are described in the context of a single implementation also can be implemented in multiple examples separately or in any suitable subcombination. As such, although features may be described above as acting in particular combinations, and even initially claimed as such, one or more features from a claimed combination can in some implementations be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the examples described above should not be understood as requiring such separation in all examples, and it should be understood that the described program components and systems can generally be integrated together in a single software product or packaged into multiple software products.

What is claimed is:

1. An apparatus for wireless communication at a first wireless device, comprising:
at least one memory; and
at least one processor communicatively coupled with the at least one memory, the at least one processor operable to cause the first wireless device to:
transmit a set of parameters for a sensing session setup of one or more sensing instances, wherein the one or more sensing instances are associated with operation of the first wireless device and at least a second wireless device in an ultra-wideband system;
transmit, for each of the one or more sensing instances, a sensing control information element that includes at least a common sensing control configuration and a channel impulse response report configuration;
participate in one or more respective sensing operations during the one or more sensing instances; and
wherein the sensing control information element includes a common sensing control present field that indicates a presence of the common sensing control configuration in the sensing control information element and a channel impulse response report parameters present field that indicates a presence of the channel impulse response report configuration in the sensing control information element.

2. The first wireless device of claim 1, wherein the at least one processor is further operable to cause the first wireless device to:
participate, based at least in part on participating in the one or more respective sensing operations, in communication of a channel impulse response report in accordance with the channel impulse response report configuration.

3. The first wireless device of claim 2, wherein the channel impulse response report is a medium access control layer management entity report.

4. The first wireless device of claim 2, wherein the channel impulse response report is an over-the-air entity report.

5. The first wireless device of claim 1, wherein the at least one processor is further operable to cause the first wireless device to:
receive, based at least in part on transmitting the set of parameters for the sensing session setup of the one or more sensing instances, an acceptance of the set of parameters.

6. An apparatus for wireless communication at a first wireless device, comprising:
at least one memory; and
at least one processor communicatively coupled with the at least one memory, the at least one processor operable to cause the first wireless device to:
transmit a set of parameters for a sensing session setup of one or more sensing instances, wherein the one or more sensing instances are associated with operation of the first wireless device and at least a second wireless device in an ultra-wideband system;
transmit, for each of the one or more sensing instances, a sensing control information element that includes at least a common sensing control configuration and a channel impulse response report configuration;
participate in one or more respective sensing operations during the one or more sensing instances; and
wherein the common sensing control configuration includes at least a sensing mode field, a responder role field, a sensing packet format field, a set of reserved bits, or any combination thereof.

7. The first wireless device of claim 6, wherein the sensing mode field indicates that the one or more sensing instances are associated with a mono-static sensing operation, a bi-static sensing operation, or a multi-static sensing operation.

8. The first wireless device of claim 6, wherein the responder role field indicates whether a responder in the one or more respective sensing operations is a transmitter wireless device or a receiver wireless device.

9. The first wireless device of claim 6, wherein the sensing packet format field indicates a physical layer packet format to be used for the one or more respective sensing operations.

10. An apparatus for wireless communication at a first wireless device, comprising:
at least one memory; and
at least one processor communicatively coupled with the at least one memory, the at least one processor operable to cause the first wireless device to:
transmit a set of parameters for a sensing session setup of one or more sensing instances, wherein the one or more sensing instances are associated with operation of the first wireless device and at least a second wireless device in an ultra-wideband system;
transmit, for each of the one or more sensing instances, a sensing control information element that includes at least a common sensing control configuration and a channel impulse response report configuration;
participate in one or more respective sensing operations during the one or more sensing instances; and
wherein the channel impulse response report configuration includes a bitmap mode field that indicates a bitmap mode associated with a bitmap of a channel impulse response report.

11. The first wireless device of claim 10, wherein the bitmap mode is a first bitmap mode indicating that the first wireless device is to select a bitmap from a predefined set of bitmaps for the channel impulse response report, a second bitmap mode indicating that the first wireless device is to define a bitmap for the channel impulse response report, or a third bitmap mode indicating that the second wireless device is to indicate a bitmap for the channel impulse response report, wherein the first wireless device is an initiator of the one or more respective sensing operations and the second wireless device is a responder to the one or more respective sensing operations.

12. The first wireless device of claim 11, wherein the bitmap mode is the first bitmap mode, and wherein the channel impulse response report configuration includes at least a bitmap offset field, a bitmap window length field, a bitmap sub-window length field, a bitmap gap field, or a combination thereof that indicate the bitmap selected for the channel impulse response report.

13. The first wireless device of claim 11, wherein the bitmap mode is the second bitmap mode, and wherein the channel impulse response report configuration includes at least a bitmap field that explicitly indicates the bitmap defined for the channel impulse response report.

14. An apparatus for wireless communication at a first wireless device, comprising:
at least one memory; and
at least one processor communicatively coupled with the at least one memory, the at least one processor operable to cause the first wireless device to:
transmit a set of parameters for a sensing session setup of one or more sensing instances, wherein the one or more sensing instances are associated with operation of the first wireless device and at least a second wireless device in an ultra-wideband system;
transmit, for each of the one or more sensing instances, a sensing control information element that includes at least a common sensing control configuration and a channel impulse response report configuration;
participate in one or more respective sensing operations during the one or more sensing instances; and
wherein the channel impulse response report configuration includes one or more channel impulse response report processing fields that indicate to process a channel impulse response report to generate at least a range, a velocity, an angle of arrival (AOA), or a combination thereof associated with an object.

15. An apparatus for wireless communication at a first wireless device, comprising:
at least one memory; and
at least one processor communicatively coupled with the at least one memory, the at least one processor operable to cause the first wireless device to:
transmit a set of parameters for a sensing session setup of one or more sensing instances, wherein the one or more sensing instances are associated with operation of the first wireless device and at least a second wireless device in an ultra-wideband system;
transmit, for each of the one or more sensing instances, a sensing control information element that includes at least a common sensing control configuration and a channel impulse response report configuration;
participate in one or more respective sensing operations during the one or more sensing instances; and
wherein a sensing instance comprises a sensing control phase, a sensing phase, and a sensing measurement report phase.

16. An apparatus for wireless communication at a first wireless device, comprising:
at least one memory; and
at least one processor communicatively coupled with the at least one memory, the at least one processor operable to cause the first wireless device to:
transmit a set of parameters for a sensing session setup of one or more sensing instances, wherein the one or more sensing instances are associated with operation of the first wireless device and at least a second wireless device in an ultra-wideband system;
transmit, for each of the one or more sensing instances, a sensing control information element that includes at least a common sensing control configuration and a channel impulse response report configuration;
participate in one or more respective sensing operations during the one or more sensing instances; and
wherein, to transmit the sensing control information element, the at least one processor is operable to cause the first wireless device to:
transmit, for each of the one or more sensing instances and for each second wireless device associated with the one or more sensing instances, a medium access control frame indicating the sensing control information element, wherein the medium access control frame is associated with a medium access control address of a respective second wireless device.

17. An apparatus for wireless communication at a first wireless device, comprising:
at least one memory; and
at least one processor communicatively coupled with the at least one memory, the at least one processor operable to cause the first wireless device to:
receive a set of parameters for a sensing session setup of one or more sensing instances, wherein the one or more sensing instances are associated with operation of the first wireless device and at least a second wireless device in an ultra-wideband system;
receive, for each of the one or more sensing instances, a sensing control information element that includes at least a common sensing control configuration and a channel impulse response report configuration;
participate in one or more respective sensing operations during the one or more sensing instances; and
wherein the sensing control information element includes a common sensing control present field that indicates a presence of the common sensing control configuration in the sensing control information element and a channel impulse response report parameters present field that indicates a presence of the channel impulse response report configuration in the sensing control information element.

18. The first wireless device of claim 17, wherein the channel impulse response report configuration includes one or more channel impulse response report processing fields that indicate to process a channel impulse response report to generate at least a range, a velocity, an angle of arrival (AOA), or a combination thereof associated with an object.

19. The first wireless device of claim 17, wherein the at least one processor is further operable to cause the first wireless device to:
participate, based at least in part on participating in the one or more respective sensing operations, in communication of a channel impulse response report in accordance with the channel impulse response report configuration.

20. The first wireless device of claim 19, wherein the channel impulse response report is a medium access control layer management entity report.

21. The first wireless device of claim 19, wherein the channel impulse response report is an over-the-air entity report.

22. The first wireless device of claim 17, wherein, to receive the sensing control information element, the at least one processor is operable to cause the first wireless device to:
receive, for each of the one or more sensing instances, a medium access control frame indicating the sensing control information element, wherein the medium access control frame is associated with a medium access control address of the second wireless device.

23. An apparatus for wireless communication at a first wireless device, comprising:
at least one memory; and
at least one processor communicatively coupled with the at least one memory, the at least one processor operable to cause the first wireless device to:
receive a set of parameters for a sensing session setup of one or more sensing instances, wherein the one or more sensing instances are associated with operation of the first wireless device and at least a second wireless device in an ultra-wideband system;
receive, for each of the one or more sensing instances, a sensing control information element that includes at least a common sensing control configuration and a channel impulse response report configuration;
participate in one or more respective sensing operations during the one or more sensing instances; and
wherein the common sensing control configuration includes at least a sensing mode field, a responder role field, a sensing packet format field, a set of reserved bits, or any combination thereof.

24. The first wireless device of claim 23, wherein the sensing mode field indicates that the one or more sensing instances are associated with a mono-static sensing operation, a bi-static sensing operation, or a multi-static sensing operation.

25. The first wireless device of claim 23, wherein the responder role field indicates whether a responder in the one or more respective sensing operations is a transmitter wireless device or a receiver wireless device.

26. The first wireless device of claim 23, wherein the sensing packet format field indicates a physical layer packet format to be used for the one or more respective sensing operations.

27. An apparatus for wireless communication at a first wireless device, comprising:
at least one memory; and
at least one processor communicatively coupled with the at least one memory, the at least one processor operable to cause the first wireless device to:
receive a set of parameters for a sensing session setup of one or more sensing instances, wherein the one or more sensing instances are associated with operation of the first wireless device and at least a second wireless device in an ultra-wideband system;
receive, for each of the one or more sensing instances, a sensing control information element that includes at least a common sensing control configuration and a channel impulse response report configuration;
participate in one or more respective sensing operations during the one or more sensing instances; and
wherein the channel impulse response report configuration includes a bitmap mode field that indicates a bitmap mode associated with a bitmap of a channel impulse response report.

28. The first wireless device of claim 27, wherein the bitmap mode is a first bitmap mode indicating that the first wireless device is to select a bitmap from a predefined set of bitmaps for the channel impulse response report, a second bitmap mode indicating that the first wireless device is to define a bitmap for the channel impulse response report, or a third bitmap mode indicating that a second wireless device is to indicate a bitmap for the channel impulse response report, wherein the first wireless device is an initiator of the one or more respective sensing operations and the second wireless device is a responder to the one or more respective sensing operations.

29. The first wireless device of claim 28, wherein the bitmap mode is the first bitmap mode, and wherein the channel impulse response report configuration includes at least a bitmap offset field, a bitmap window length field, a bitmap sub-window length field, a bitmap gap field, or a combination thereof that indicate the bitmap selected for the channel impulse response report.

30. The first wireless device of claim 28, wherein the bitmap mode is the second bitmap mode, and wherein the channel impulse response report configuration includes at least a bitmap field that explicitly indicates the bitmap defined for the channel impulse response report.

31. An apparatus for wireless communication at a first wireless device, comprising:
at least one memory; and
at least one processor communicatively coupled with the at least one memory, the at least one processor operable to cause the first wireless device to:
receive a set of parameters for a sensing session setup of one or more sensing instances, wherein the one or more sensing instances are associated with operation of the first wireless device and at least a second wireless device in an ultra-wideband system;
receive, for each of the one or more sensing instances, a sensing control information element that includes at least a common sensing control configuration and a channel impulse response report configuration;
participate in one or more respective sensing operations during the one or more sensing instances; and
wherein the at least one processor is further operable to cause the first wireless device to:
transmit, based at least in part on receiving the set of parameters for a sensing session setup of one or more sensing instances a rejection of the set of parameters and an indication of a second set of parameters for the one or more sensing instances.

32. An apparatus for wireless communication at a first wireless device, comprising:
at least one memory; and
at least one processor communicatively coupled with the at least one memory, the at least one processor operable to cause the first wireless device to:
receive a set of parameters for a sensing session setup of one or more sensing instances, wherein the one or more sensing instances are associated with operation of the first wireless device and at least a second wireless device in an ultra-wideband system;
receive, for each of the one or more sensing instances, a sensing control information element that includes at least a common sensing control configuration and a channel impulse response report configuration;
participate in one or more respective sensing operations during the one or more sensing instances; and
wherein a sensing instance comprises a sensing control phase, a sensing phase, and a sensing measurement report phase.

33. A method for wireless communication at a first wireless device, comprising:
transmitting a set of parameters for a sensing session setup of one or more sensing instances, wherein the one or more sensing instances are associated with operation of the first wireless device and at least a second wireless device in an ultra-wideband system;

transmitting, for each of the one or more sensing instances, a sensing control information element that includes at least a common sensing control configuration and a channel impulse response report configuration;

participating in one or more respective sensing operations during the one or more sensing instances; and wherein the sensing control information element includes a common sensing control present field that indicates a presence of the common sensing control configuration in the sensing control information element and a channel impulse response report parameters present field that indicates a presence of the channel impulse response report configuration in the sensing control information element.

34. A method for wireless communication at a first wireless device, comprising:

transmitting a set of parameters for a sensing session setup of one or more sensing instances, wherein the one or more sensing instances are associated with operation of the first wireless device and at least a second wireless device in an ultra-wideband system;

transmitting, for each of the one or more sensing instances, a sensing control information element that includes at least a common sensing control configuration and a channel impulse response report configuration;

participating in one or more respective sensing operations during the one or more sensing instances; and wherein the common sensing control configuration includes at least a sensing mode field, a responder role field, a sensing packet format field, a set of reserved bits, or any combination thereof.

35. A method for wireless communication at a first wireless device, comprising:

receiving a set of parameters for a sensing session setup of one or more sensing instances, wherein the one or more sensing instances are associated with operation of the first wireless device and at least a second wireless device in an ultra-wideband system;

receiving, for each of the one or more sensing instances, a sensing control information element that includes at least a common sensing control configuration and a channel impulse response report configuration;

participating in one or more respective sensing operations during the one or more sensing instances; and wherein the sensing control information element includes a common sensing control present field that indicates a presence of the common sensing control configuration in the sensing control information element and a channel impulse response report parameters present field that indicates a presence of the channel impulse response report configuration in the sensing control information element.

36. A method for wireless communication at a first wireless device, comprising:

receiving a set of parameters for a sensing session setup of one or more sensing instances, wherein the one or more sensing instances are associated with operation of the first wireless device and at least a second wireless device in an ultra-wideband system;

receiving, for each of the one or more sensing instances, a sensing control information element that includes at least a common sensing control configuration and a channel impulse response report configuration;

participating in one or more respective sensing operations during the one or more sensing instances; and wherein the common sensing control configuration includes at least a sensing mode field, a responder role field, a sensing packet format field, a set of reserved bits, or any combination thereof.

* * * * *